Figure 4:
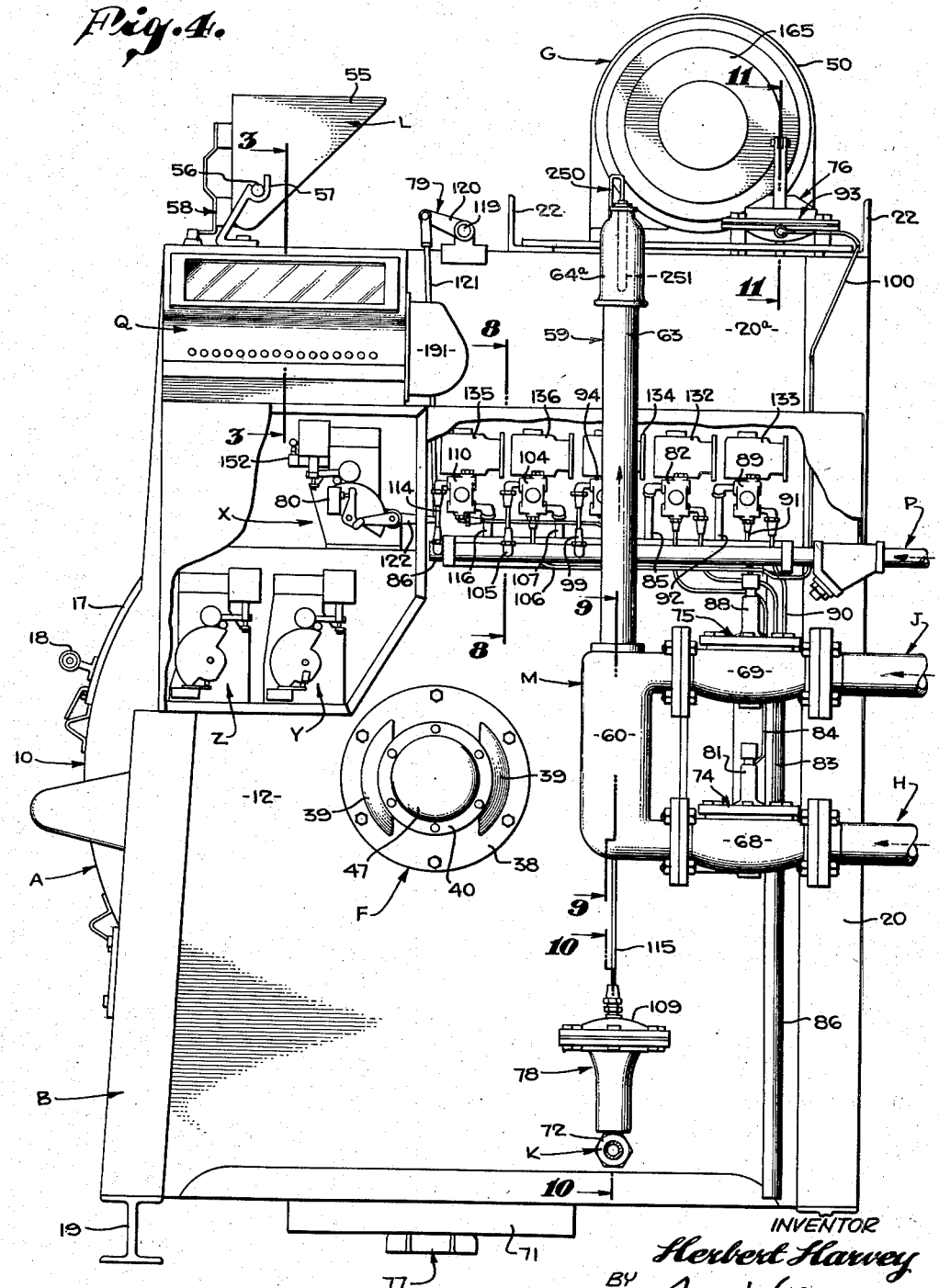

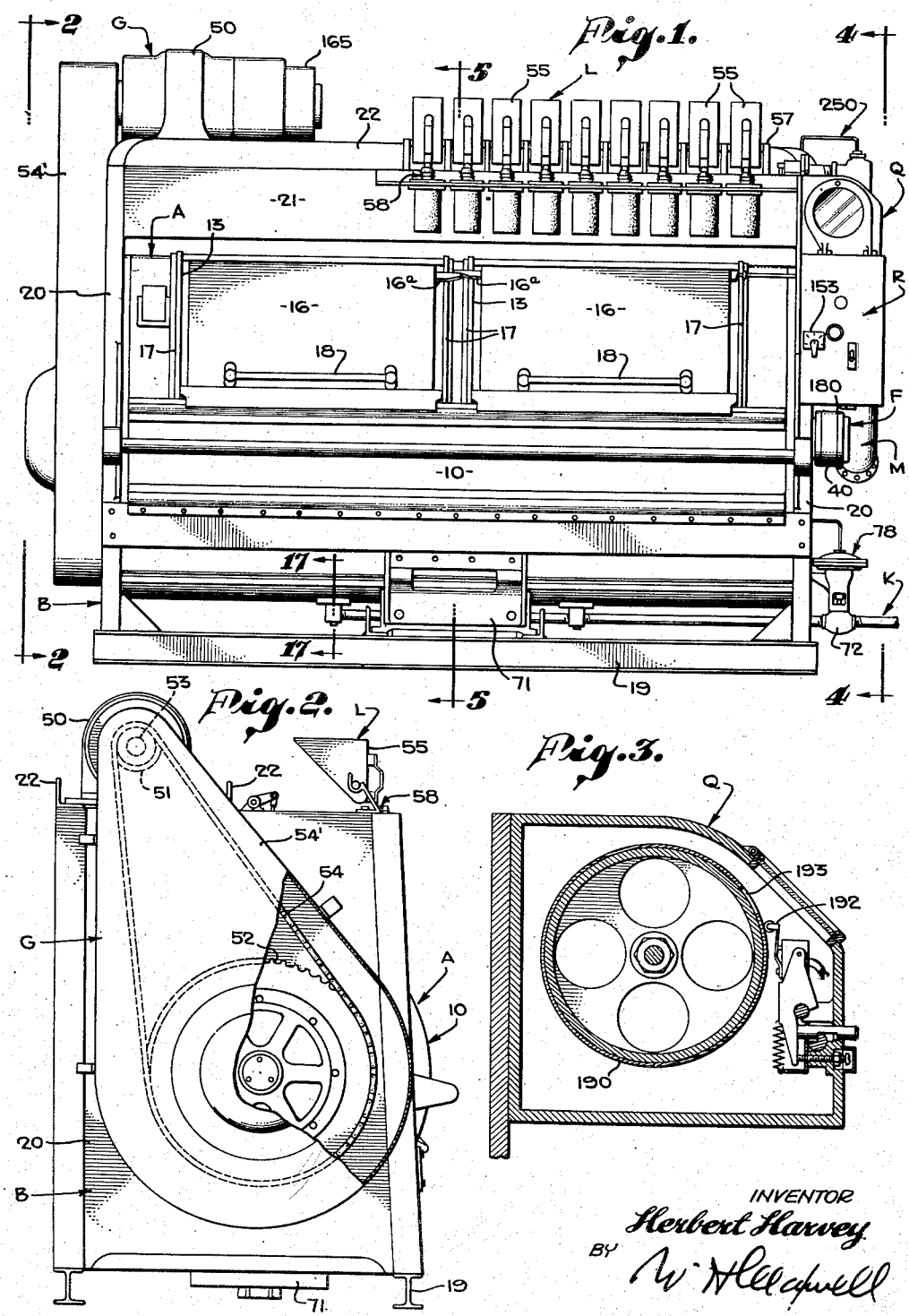

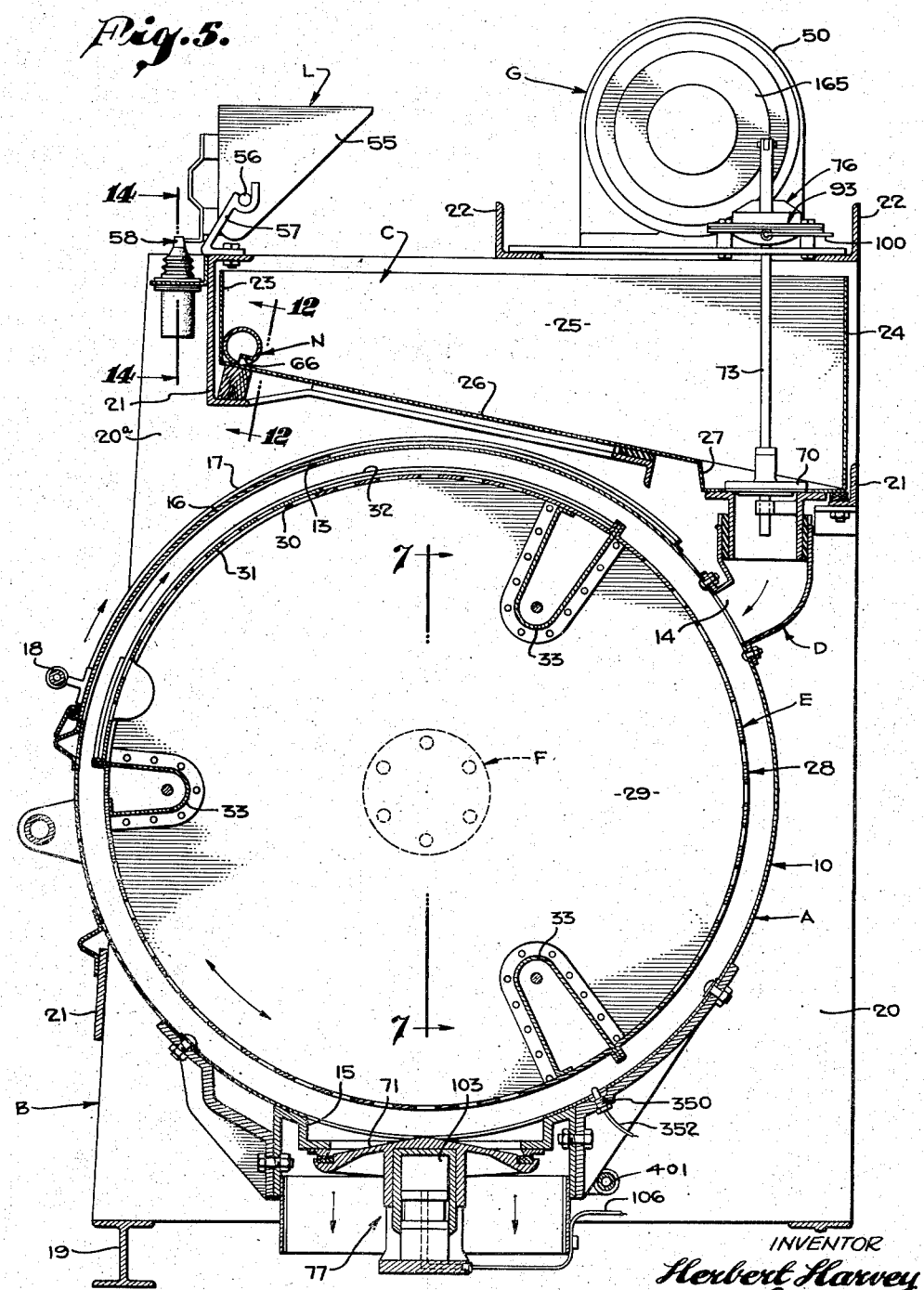

Sept. 1, 1953
H. HARVEY
2,650,489
POWER-DRIVEN WASHING MACHINE GOVERNED
BY A MASTER CONTROL
Filed Nov. 24, 1947
11 Sheets-Sheet 4
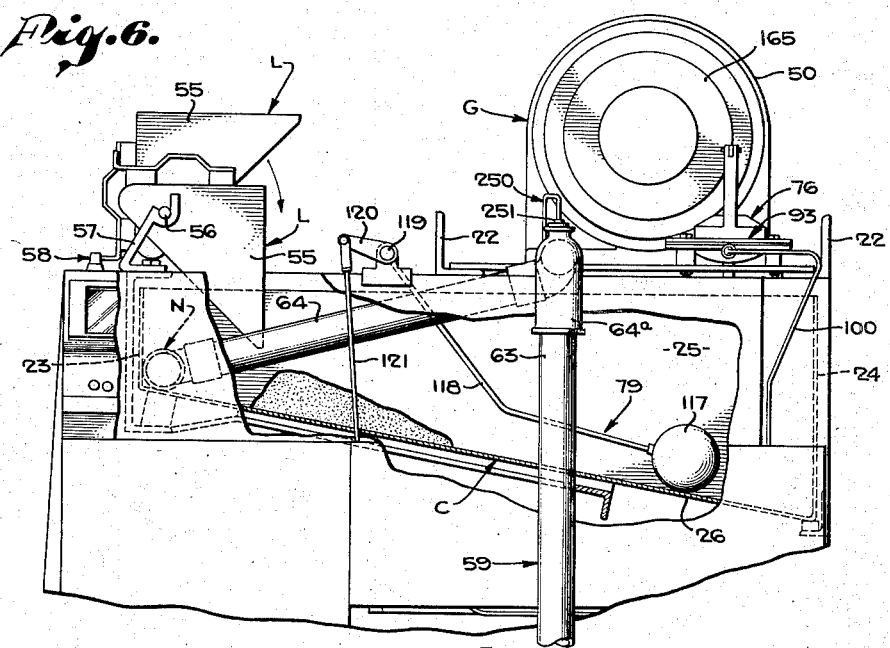
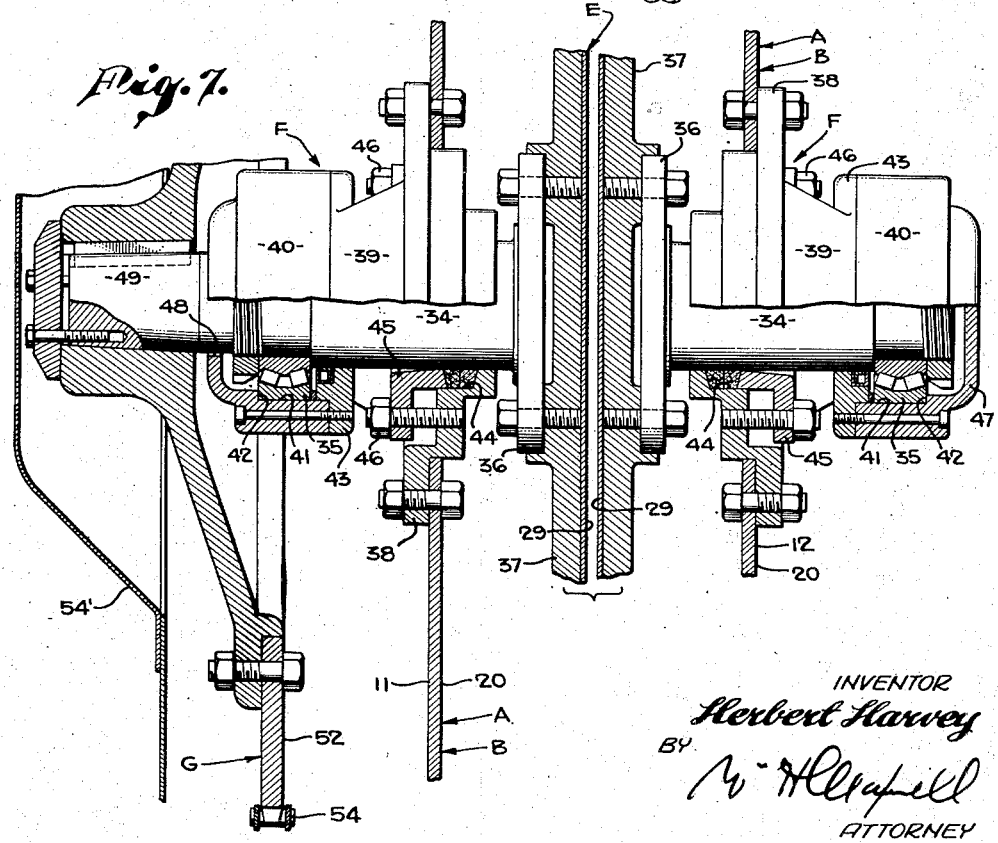
INVENTOR
Herbert Harvey
BY
ATTORNEY Sept. 1, 1953

H. HARVEY 2,650,489

POWER-DRIVEN WASHING MACHINE GOVERNED
BY A MASTER CONTROL

Filed Nov. 24, 1947

11 Sheets-Sheet 5

INVENTOR
Herbert Harvey
BY
ATTORNEY

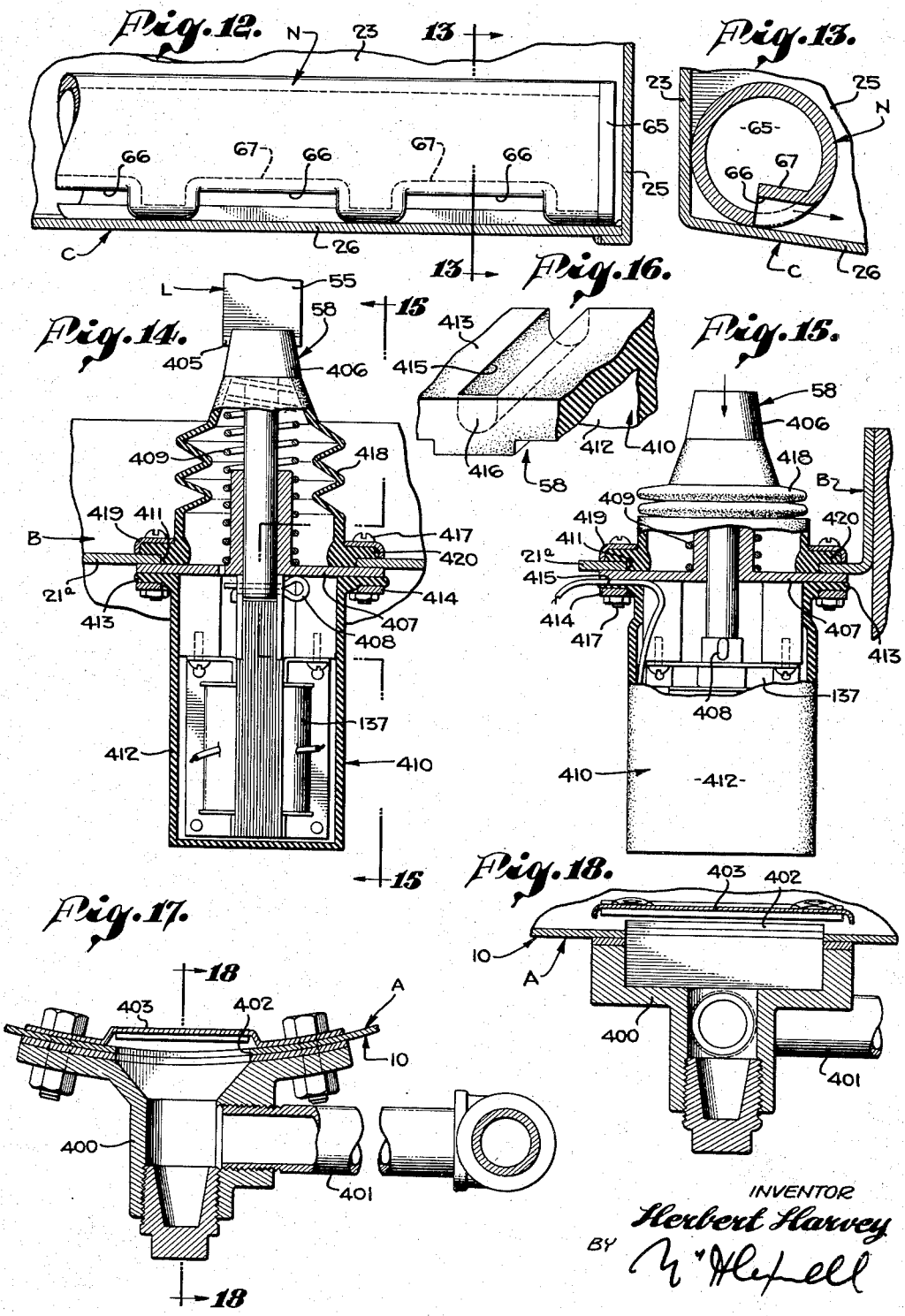

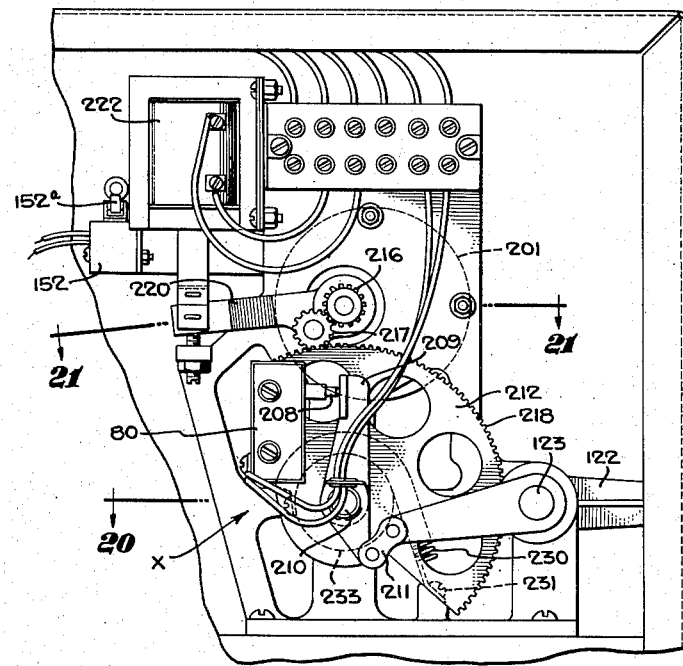
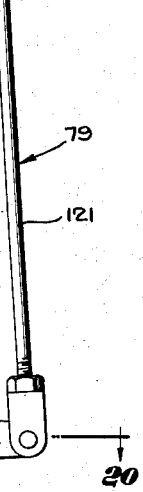
Fig. 19.
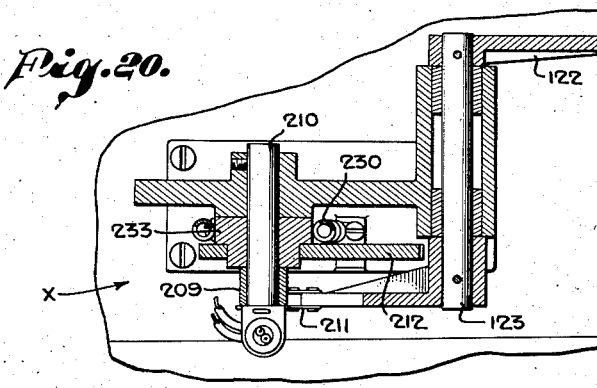
Fig. 20.
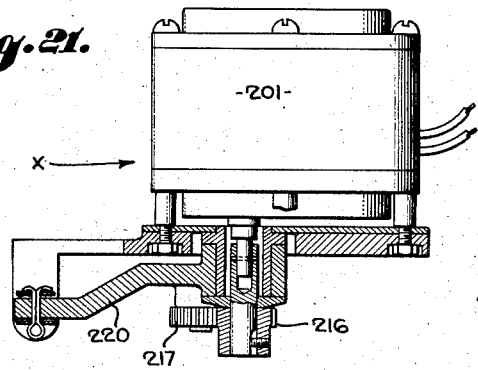
Fig. 21.
INVENTOR
Herbert Harvey
BY
ATTORNEY Sept. 1, 1953 H. HARVEY 2,650,489
POWER-DRIVEN WASHING MACHINE GOVERNED
BY A MASTER CONTROL
Filed Nov. 24, 1947 11 Sheets-Sheet 8
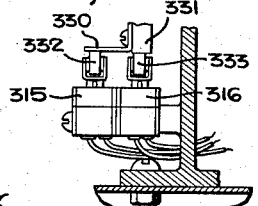
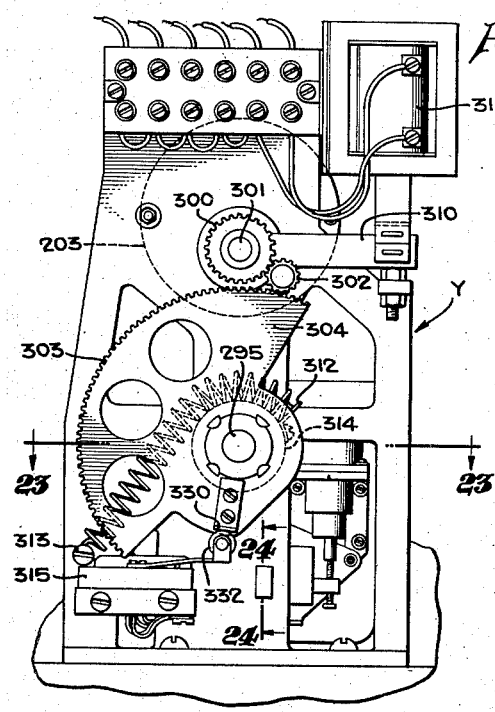
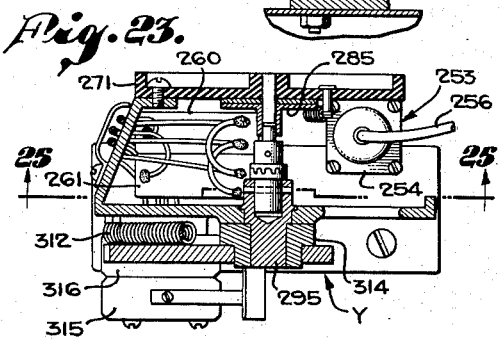
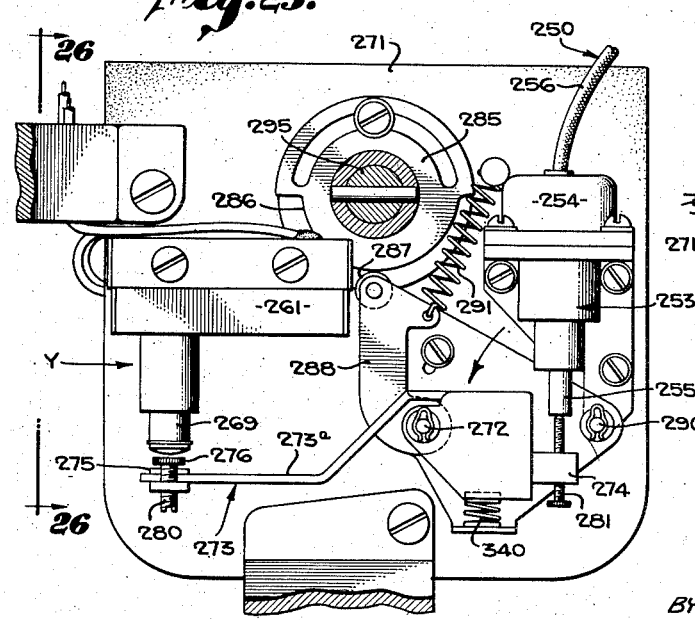
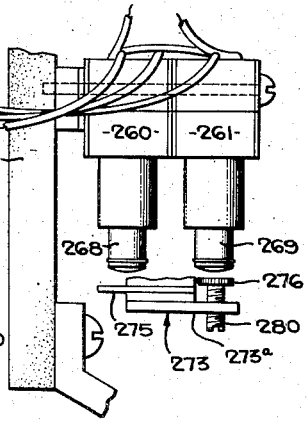
INVENTOR
Herbert Harvey
BY
ATTORNEY Sept. 1, 1953 H. HARVEY 2,650,489
POWER-DRIVEN WASHING MACHINE GOVERNED
BY A MASTER CONTROL
Filed Nov. 24, 1947 11 Sheets-Sheet 9
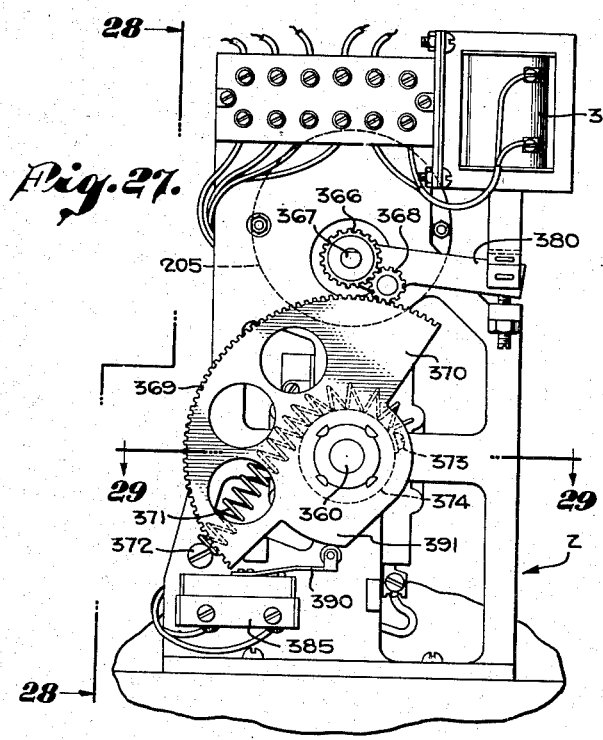
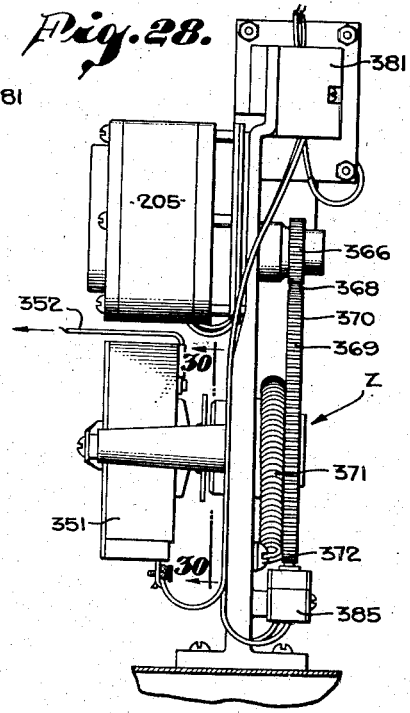
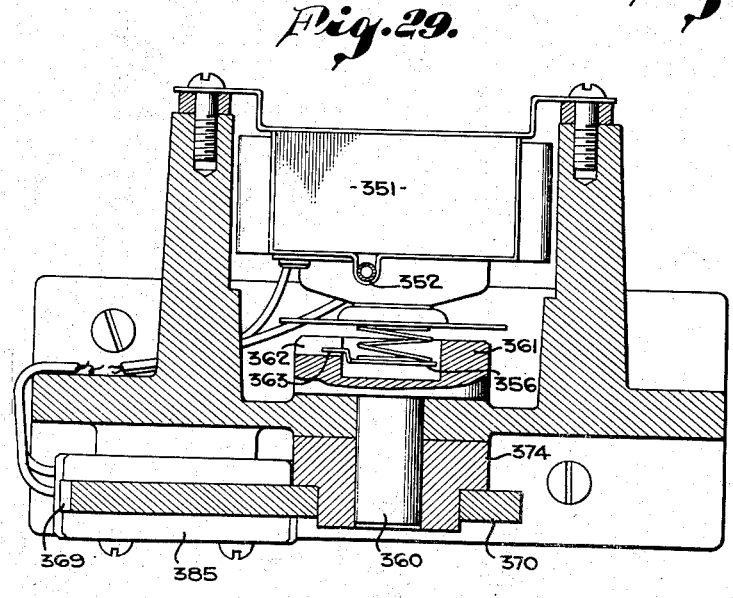
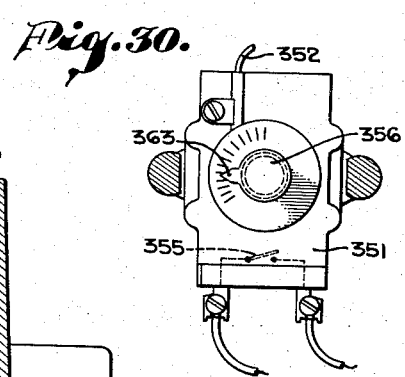
INVENTOR
Herbert Harvey
BY
ATTORNEY

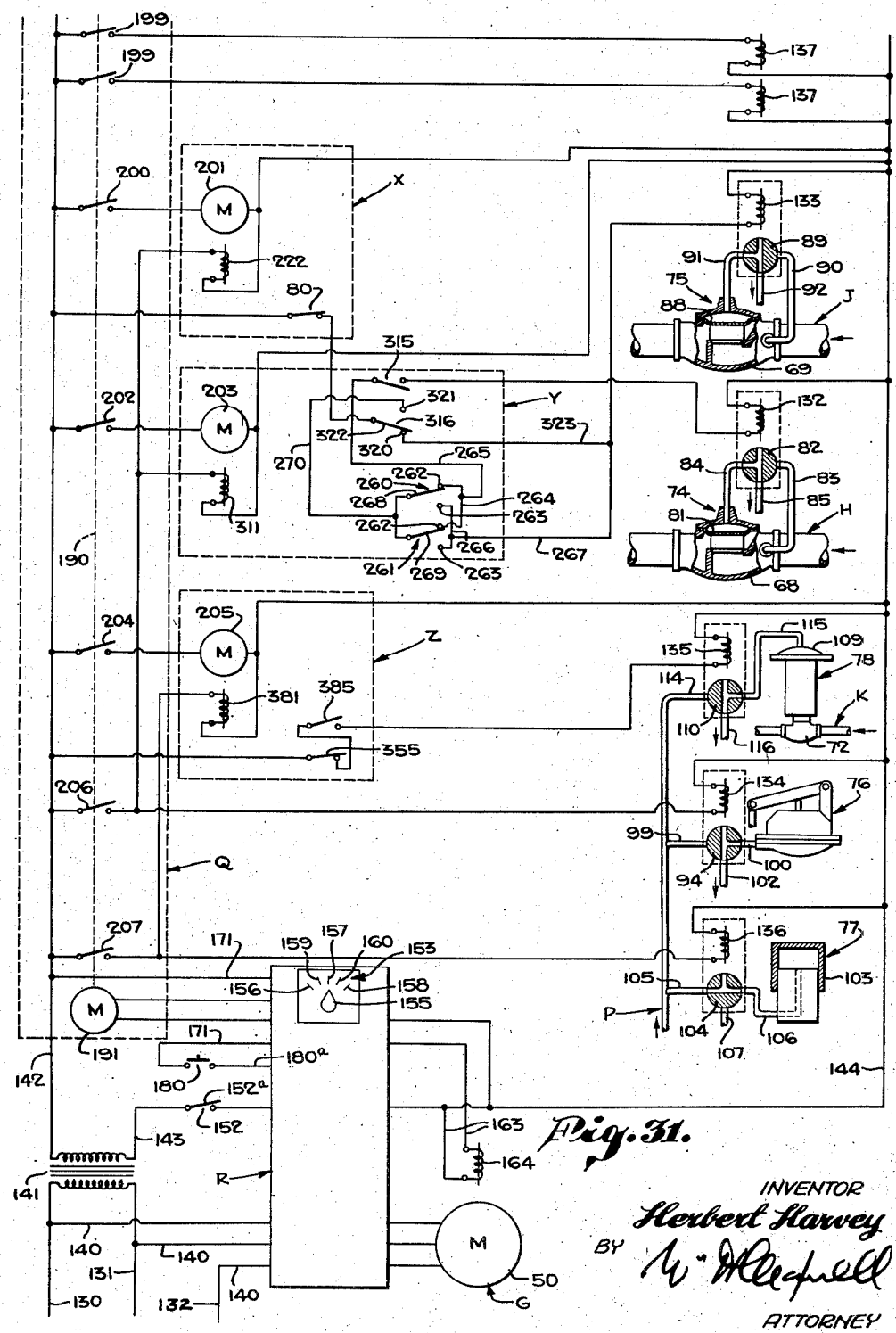

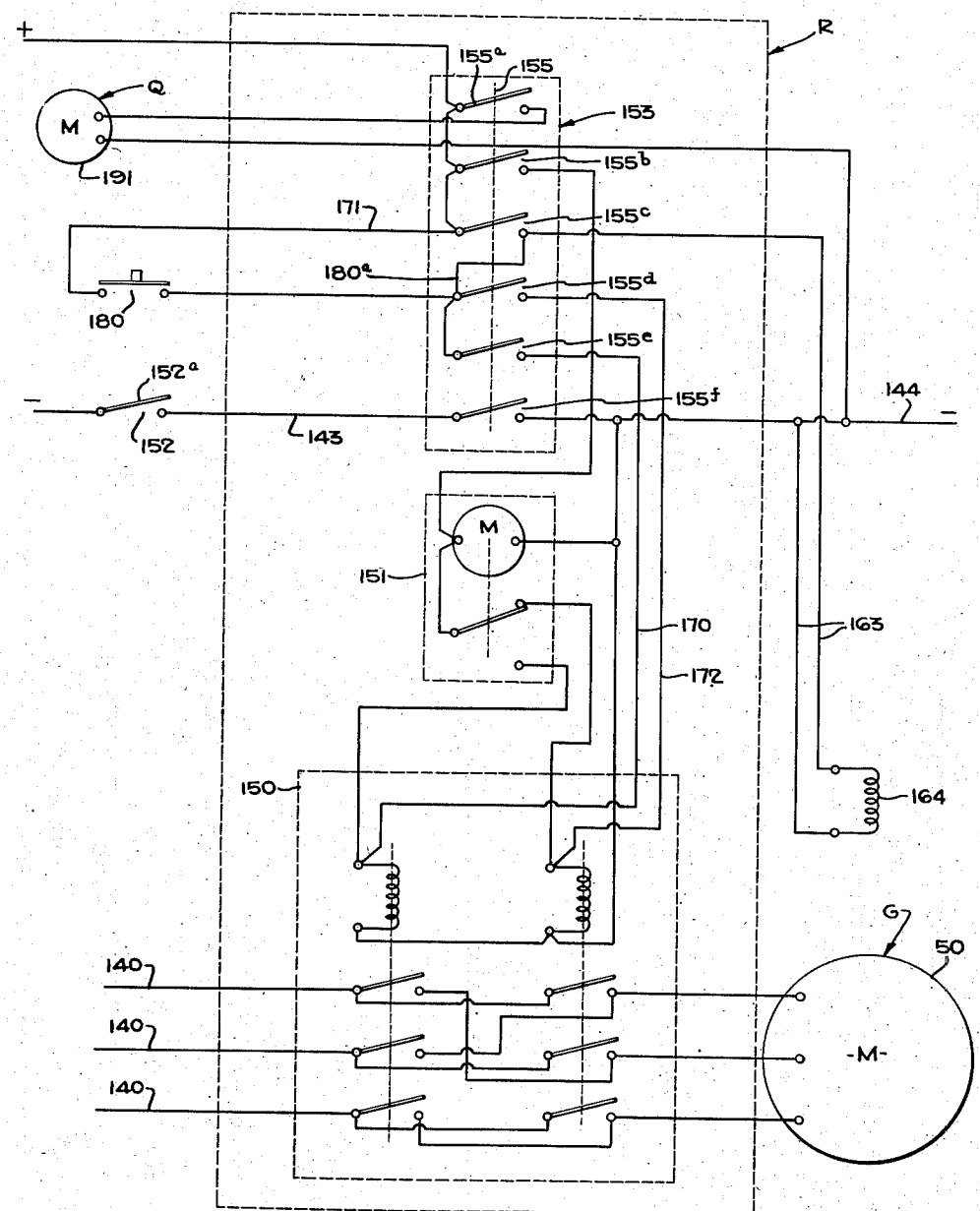

Patented Sept. 1, 1953

2,650,489

UNITED STATES PATENT OFFICE 2,650,489

POWER-DRIVEN WASHING MACHINE
GOVERNED BY A MASTER CONTROL

Herbert Harvey, Los Angeles, Calif., assignor, by mesne assignments, to Robot Laundry Machinery Corporation of California, Los Angeles, Calif., a corporation of California Application November 24, 1947, Serial No. 787,830

17 Claims. (Cl. 68—12)

1

This invention had to do with a power driven washing machine governed by a master control and it is a general object of the invention to provide various improvements in the controls, the construction and the arrangement of parts, in a machine of this general character.

This invention is concerned with that type of washing machine wherein clothes or other objects to be washed are placed in a barrel carried within a tank, and wherein the operation of the barrel, the supply and discharge of water, and the handling of materials such as soaps, bleaches, etc. are governed by a master control so that the machine operates through a full cycle during which the tank may be supplied with different quantities of water at different temperatures and with different materials therein, and for different time intervals, all to the end that a complete and satisfactory washing operation is carried out without care of attention upon the part of the operator.

In the type of machine with which I am concerned the water used is received from two sources, a hot water supply and a cold water supply. The materials such as soaps, bleaches, etc. to be used are in individual containers that discharge such materials into a mixing tank where the water is mixed with the materials preliminary to being introduced into the washing tank. Further, I prefer to apply my invention to that type of machine wherein the tank is a horizontally disposed cylindrical structure and the barrel is a corresponding structure located within the tank, the tank and barrel each being provided with a plurality of access openings equipped with suitable closures, the openings of the barrel being registerable with those of the tank to provide the necessary access to the barrel so that clothes can be placed in or removed from the barrel.

A general object of my present invention is to provide a control for the water supply to such a machine which control involves means governing the quantity of water supplied and serves to fully open or fully close the valves governing the hot and cold water, and further includes thermally controlled means determining the temperature of water and modifying the action of the first mentioned means and individually opening and closing the hot and cold water valves in response to a thermostat.

Another object of my invention is to provide a machine of the general character referred to wherein elements such as the hot and cold water valves are hydraulically operated through electrical controls responsive to a single or common

2 master control which is preset so that the machine has a predetermined action or cycle of operation.

Another general object of the invention is to provide a machine of the general character referred to wherein the temperature of the water introduced into the washing tank is maintained in the desired manner through the introduction of steam into the tank, the introduction of the steam being governed by the master control.

A further object of the present invention is to provide a machine of the general character referred to which is simple, convenient, and safe to operate. With the construction that I have provided the master control provides for operation of the machine through the desired cycle and the control system is such that steam or water cannot enter the washing tank at a time when the closures of the tank and barrel within the tank are open.

Figure 8:
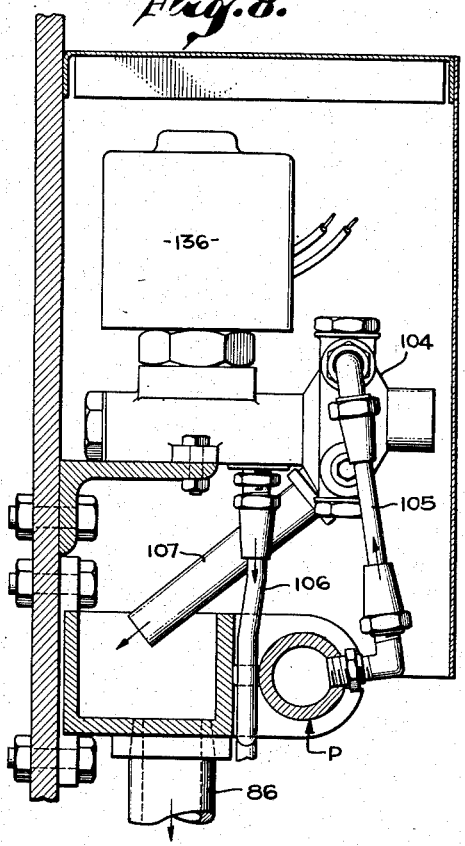
Figure 9:
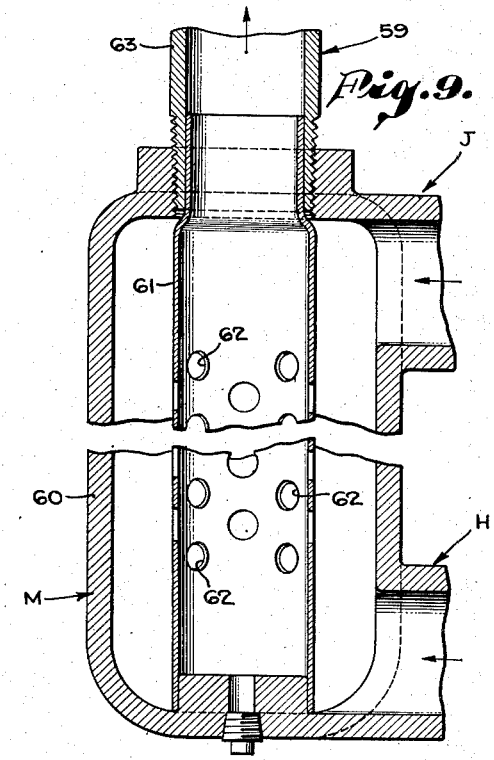
Figure 10:
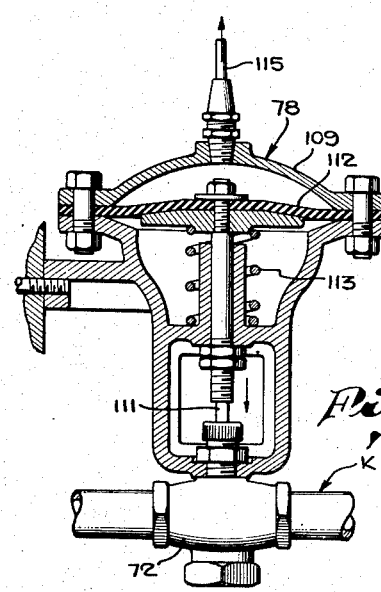
Figure 11:
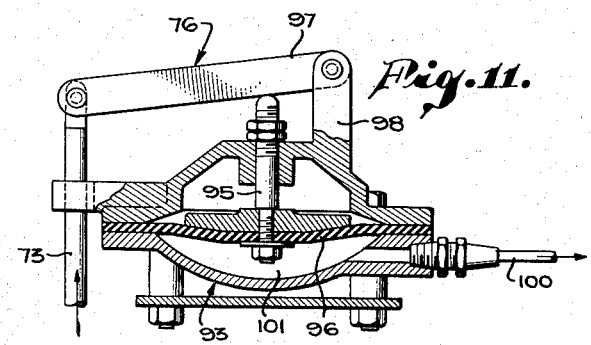

The various objects and features of my invention will be fully understood from the following detailed description of a typical preferred form and application of the invention, throughout which description reference is made to the accompanying drawings, in which:

Fig. 1 is a front elevation of the machine embodying the present invention showing it in condition for operation. Fig. 2 is an end elevation of the machine taken as indicated by line 2—2 on Fig. 1 with some portions broken away to illustrate parts of the machine. Fig. 3 is an enlarged detailed sectional view of the master control, being an enlarged view taken substantially as indicated by line 3—3 on Fig. 4. Fig. 4 is an enlarged end elevation of the machine being an enlarged view taken as indicated by line 4—4 on Fig. 1. Fig. 5 is an enlarged transverse sectional view of the machine taken substantially as indicated by line 5—5 on Fig. 1. Fig. 6 is a view showing the upper portion of Fig. 4 with portions broken away to illustrate parts of the machine and showing a material container or bucket in a position to have dumped or deposited material into the mixing tank. Fig. 7 is an enlarged detailed sectional view taken through the central portion of the machine to illustrate the mountings by which the barrel is carried within the tank, being a view taken in the direction indicated by line 7—7 on Fig. 5, with parts broken away between the end portions of the machine to illustrate only the mountings that carry the barrel. Fig. 8 is an enlarged detailed sectional view of a control part, being an enlarged view taken as indicated by line 8—8 on Fig. 4. Fig. 9 is an enlarged sectional view of the water mixer being a view taken as indicated by line 9—9 on Fig. 4. Fig. 10 is an enlarged sectional view illustrating the steam control, being a view taken as indicated by line 10—10 on Fig. 4. Fig. 11 is a detailed sectional view of a portion of the water quantity control, being a view taken substantially as indicated by line 11—11 on Fig. 4. Fig. 12 is a view showing a portion of the water distributing pipe employed in the mixing tank being a view taken as indicated by line 12—12 on Fig. 5. Fig. 13 is a detailed sectional view taken as indicated by line 13—13 on Fig. 12. Fig. 14 is an enlarged detailed sectional view illustrating a part of the electrical control for a material carrier or bucket, being an enlarged view taken as indicated by line 14—14 on Fig. 5. Fig. 15 is a view taken substantially as indicated by line 15—15 on Fig. 14, showing the control operated to release a bucket. Fig. 16 is a perspective view showing a fragmentary portion of the structure illustrated in Fig. 15, showing the shape in which this portion is formed before assembly. Fig. 17 is an enlarged detailed sectional view taken at the point where steam is introduced into the tank, being an enlarged view as indicated by line 17—17 on Fig. 1. Fig. 18 is a sectional view taken as indicated by line 18—18 on Fig. 17. Fig. 19 is an enlarged detailed view illustrating another part of the quantity control. Fig. 20 is a plan section of parts shown in Fig. 19, being a view taken as indicated by line 20—20 on Fig. 19. Fig. 21 is a plan view taken substantially as indicated by line 21—21 on Fig. 19. Fig. 22 is a view similar to Fig. 19 showing a part of the temperature control. Fig. 23 is a plan section taken as indicated by line 23—23 on Fig. 22. Fig. 24 is a detailed sectional view taken as indicated by line 24—24 on Fig. 22. Fig. 25 is an enlarged transverse sectional view taken as indicated by line 25—25 on Fig. 23. Fig. 26 is a view taken as indicated by line 26—26 on Fig. 25. Fig. 27 is a view similar to Figs. 19 and 22 illustrating a part of the steam control. Fig. 28 is a view taken as indicated by line 28—28 on Fig. 27. Fig. 29 is an enlarged detailed transverse sectional view taken as indicated by line 29—29 on Fig. 27. Fig. 30 is a sectional view taken as indicated by line 30—30 on Fig. 28. Fig. 31 is a diagrammatic view showing the general relationship of the principal elements and showing the electrical circuit employed in carrying out the present invention, and Fig. 32 is a view showing in detail a portion of the circuit illustrated in Fig. 31.

In describing the structure embodying my invention I will proceed, first, to describe the general or basic elements of the washing machine, and will follow with a description of the controls that I provide.

The machine in the form illustrated throughout the drawings involves, generally, a main tank A that may be referred to as the washing tank, a mounting or support B for the tank A, a mixing chamber C located above tank A and preferably carried by support B, a fluid connection D between the outlet of the mixing chamber and the inlet of the washing tank, a washing drum or barrel E within the washing tank, mounting means F rotatably supporting the barrel within the tank, a drive G for the barrel, supply lines handling material or fluids used in the machine including a hot water supply line H, a cold water supply line J, and a steam supply line K, a plurality of individually operable material containers or dispensers L, a water mixer or blender M receiving water from the lines H and J, a distributor N located in chamber C and handling water received from the mixer M, and various other elements more or less identified with those mentioned.

The main tank or washing tank is a stationary cylindrical structure in which the washing operation occurs and it is preferably horizontally disposed. In the case illustrated the tank A is shown as including a horizontally disposed cylindrical body 10 and ends 11 and 12 fixed to and closing the ends of the body. The body is characterized by one or more access openings 13, an inlet opening 14, and an outlet opening 15.

The access opening or openings, as the case may be, are preferably located at the upper forward portion of the machine where they are convenient to the operator. In the particular case illustrated the body 10 is provided with two like access openings 13 arranged side by side or in horizontal alignment. A closure 16 is provided for each access opening 13 and in the case illustrated the closures are shown as arcuate plate-like elements conforming in contour to the body 10 and slidably carried in suitable guideways 17 on the body. In the drawings, for instance in Figs. 1 and 5 of the drawings, the closures 16 are shown in the closed or down position and they are shown equipped with handles 18 by which they can be readily operated to an up or open position when desired.

The inlet opening 14 is preferably located in the upper portion of the body 10 that is above the level that liquid ever stands in the body, and in the preferred arrangement it is located at the upper rear portion of the machine as clearly shown in Fig. 5 of the drawings. The outlet opening 15 is located at the bottom of the body, preferably midway between the ends of the body and as shown in the drawings it is preferably a large opening serving to drain the body very rapidly.

The mounting or support B provided in the structure may be any suitable frame-like construction that will adequately and suitably support elements such as the tank A and chamber C. In the case illustrated the support B is shown as including a base frame 19 with uprights 20 at its ends joined to the end portions of the tank A. This frame construction may, if desired, be stiffened as by one or more suitable stiffening elements 21. The particular support construction illustrated involves top extensions 20ᵃ of the uprights 20 which extensions project above the tank 10 to carry the chamber C and beams 22 that carry the prime mover of the drive G.

The mixing chamber C is preferably a flat or shallow open-topped container of substantial capacity located immediately above the tank A. In the form illustrated the container C has vertical walls including a front wall 23, a back wall 24, and end walls 25. The chamber has an inclined or pitched flat bottom 26 that extends downwardly and rearwardly from the front wall 23 to the back wall 24. The mixing chamber is provided with an outlet opening 27 of such size and so located as to rapidly drain fluid from the mixing chamber into the tank A through the fluid connection D. Where the mixing chamber is formed and located as above described the outlet opening 27 is located in the bottom 26 adjacent the back wall 24.

The fluid connection D is preferably a simple tubular fitting coupling the mixing chamber C with the tank A so that the outlet opening of the mixing chamber is in communication with the inlet opening of the tank. With the arrangement that I have provided the connection D may be formed by a simple elbow-like fitting as clearly illustrated in Fig. 5 of the drawings.

The washing drum or barrel E is located within the tank A and is the carrier for the clothes or other objects to be washed. In the case illustrated the barrel is an elongate cylindrical structure closed at its ends and is characterized by a cylindrical perforate body portion 28 and end plates 29 fixed to and closing the ends of the body. The barrel has one or more access openings 30 which openings are preferably located in the body 28 and correspond in number and arrangement with the access openings of the washing tank. In the case illustrated there are two access openings 30 and each is provided with a closure 31 supported by suitable guides 32 so that they can be operated into and out of position where they close the openings 30, as shown in Fig. 5 of the drawings. To effect desired agitation of material or objects within the barrel E the barrel is provided with a plurality of tumbler ribs 33 which ribs are preferably suitably rounded so that they will not injure delicate objects or materials and are of such shape and proportion as to effect the desired agitation.

There is a unit of means F at each end of the barrel E serving to rotatably support the barrel in the washing tank. The units of means F are coaxial and concentric with the axis of the tank and barrel as shown throughout the drawings. Each unit of the means F is shown including a trunnion 34 fixed or secured to an end 29 of the barrel and a bearing 35 suitably supported by an end of the tank A and rotatably supporting the trunnion. In the case illustrated the trunnion 34 is connected as by a flange connection 36 to a reinforcing spider 37 in turn fixed to the end 29 of the barrel. The spider 27 may be a strong rigid element suitably fixed to a light or thin end 29 as shown in Fig. 7 of the drawings.

The bearing 35 is preferably an anti-friction bearing, say a roller bearing, and may be carried by a bracket secured to an end of the tank. The bracket construction illustrated involves an annular plate 38 fixed or made fast to the end of the tank, arms 39 projecting from the outer side of the plate, and an annular bearing housing 40 carried by the arms at a point spaced from the plate. The particular housing illustrated is shown as a sectional structure having a bore 41 carrying bearing 35 and a shoulder 42 against which the bearing is seated and a clamp section 43 secured to the main section and retaining the bearing in operating position.

A fluid seal is incorporated in the structure just referred to by providing a packing carrying opening 44 in the plate 38 surrounding the trunnion and by providing a packing follower 45 around the trunnion to compress the packing. In the drawings suitable screw operators 46 are shown provided for operating the follower.

The two units of means F are preferably alike in form and construction except that the unit attached to end 12 of the tank A involves a bearing housing with an end closure 47 whereas the unit carried by the end 11 of the tank has a bearing housing with an end opening 48 passing a trunnion extension 49.

The drive G for the barrel E preferably involves a prime mover such as a motor 50 and a suitable drive from the motor 50 to the barrel. In the case illustrated the motor 50 is located at the upper rear portion of the machine above the mixing chamber where it is suitably supported on the beams 22 carried by extensions 20ª of the support B. It is preferred to drive the barrel through one of the support trunnions above described and therefore the trunnion supported from the end 11 of the tank is provided with the extension 49. The particular drive illustrated is a chain drive involving sprockets 51 and 52 on the motor shaft 53 and trunnion extension 49, respectively. A chain 54 connects the sprockets and a suitable housing 54' preferably encases the entire drive.

The supply lines H, J and K may, in practice, enter the machine at any suitable point. However, it is desirable as shown in the drawings that they enter the machine at one end, as for instance at the end remote from the drive just described. The water lines H and J are shown entering the machine from the rear along with a pressure supply line P used as will be hereinafter described to supply actuating pressure for certain of the control elements.

Material containers L are independently operable containers preferably in the form of dump buckets 55 located to empty or dump into the open topped mixing chamber C. In the preferred arrangement the dump buckets are located in a line or series above the upper forward portion of the mixing chamber C. Each dump bucket 55 is shown provided with mounting trunnions 56 carried by brackets 57 projecting from the upper edge of the front wall 23 of the mixing chamber. The trunnions 56 are so located that the buckets 55 are overbalanced and tend to empty when in the normal or upright position, as shown in Figs. 4 and 5, making it necessary to provide means for releasably retaining them in the upright positions. For this purpose each dump bucket is provided with a releasable control or latch 58 serving to normally releasably hold the bucket upright. When the latch is released the bucket falls by gravity to a position such as is shown in Fig. 6, causing the material in the bucket to spill or empty into the mixing chamber.

Each latch 58 involves, generally, a lug 405 projecting from the bucket 55 and a retractable element or bolt 406 slidably carried by the frame B of the machines and operated by the solenoid 137 hereinafter described. The bolt 406 is slidably carried in a bracket 407 and is connected to the driving element of the solenoid 137 as by a cotter pin 408 or the like. A spring 409 normally holds the bolt 406 extended or in position where it engages the lug 405 to hold the bucket 55 upright. In practice I provide a water tight housing 410 that encloses the solenoid 137 and its related working parts. I have shown bracket 407 secured to a flat plate-like part 21ª of the frame B. The solenoid 137 is carried by the bracket beneath the plate, and the bolt is carried by the bracket to extend through an opening 411 in the plate to project above the plate. A suitable closure 412 formed of rubber or the like houses the solenoid 137. The closure has a continuous flange 413 secured to the bracket 407 by a clamp 414. As shown in Fig. 16 of the drawings the flange 413 is provided with a channel 415 opening to the interior of the closure at its inner end and having a thin flexible wall 416 defining its outer end. The channel accommodates the electrical conductors necessary for operating the solenoid 137 and the wall 416 forms a seal around the conductors. When clamp 414 is drawn into place as by screws 417 the entire flange is compressed thereby sealing around the bracket and the conductors.

I have provided water tight bellows 418 enclosing the bolt 406 and spring 409. The bellows is formed of rubber or the like and extends between the outer end of the bolt, where it is preferably molded thereto, to the plate 411 of the frame where it is secured by a clamp 419. The clamp is drawn into place by the screws 417 and engages a flange 420 at the base of the bellows. The flange 420 is of substantial thickness and when compressed by the clamp it seals against the plate and also against the bracket within the opening 411 thereby completely sealing the latch parts from outside dampness.

The water mixer M serves to blend the hot and cold water introduced into the machine through the supply lines H and J and it discharges into a flow line 59 that extends to the mixing chamber. The mixer, as shown in the drawings, involves a cylindrical chest 60 closed at its lower end and in communication with the flow line 59 at its upper end. The water supply lines H and J connect into the end portions of the chest and a baffle tube 61 is provided in the chest so that water entering the chest from the supply lines must flow through the baffle in order to reach the flow line 59. The baffle tube 61 extends between the ends of the chest and has perforations or flow passages 62 in its middle portion or remote from the points where water impinges on it from the flow lines. As a result of this arrangement water entering the chest 60 from the flow lines must flow toward the center of the chest and since the flow lines enter the end portions of the chest the hot and cold water flows in opposite directions toward the center of the chest where the hot and cold water mingles and flows through the perforations 62 to pass out of the mixer through the baffle tube 61 into the flow line 59.

The flow line 59 is shown as including a vertical section or riser 63 extending upwardly from the mixer M to a point just above the top of the mixing chamber C. A delivery section 64 of the flow line is coupled to the upper end of the riser 63, by a head 64ᵃ, and extends downward and forward from the head to the forward lower corner of the mixing chamber where it couples to the distributor N.

The distributor N provided in the mixing chamber C is preferably located within the chamber at the corner formed between the front wall 23 and the bottom 26. The distributor may be a simple elongate tubular element receiving water at one end from the delivery section 64 of the flow line and closed at its other end by a suitable closure 65. The tubular distributor thus located in the mixing chamber is provided at suitable intervals along its length with nozzle-like discharge openings 66 so formed and located as to direct water from the distributor across the bottom 26 of the mixing chamber toward the rear wall 24 thereof. In the preferred form of construction shown in the drawings the desired nozzle openings 66 are provided in the distributor by establishing longitudinal cuts in the distributor and then deflecting portions 67 of the distributor wall inwardly adjacent the cuts to establish openings, as clearly shown in Figs. 12 and 13 of the drawings.

The controls that I have provided for or in the machine involve control elements of various characters or types governing the action of the working parts or of the mediums involved, so that such mediums are governed or regulated as to temperature, quantity, timing and with reference to the general mechanical operation of the essential working elements hereinabove described. The control elements may for simplicity of consideration be generally classified as those primarily mechanical, those primarily hydraulic, those primarily thermal, and those primarily electrical. In making such segregation main or primary control valves, although handling fluids, are considered mechanical rather than hydraulic.

The main or principal mechanical elements of control involve a hot water valve 68, a cold water valve 69, an inlet valve 70 in the fluid connection D, a dump valve 71 controlling the outlet opening 15 of the wash tank, and a steam valve 72.

The hot water valve 68 may be any suitable form or type of quick acting valve effective to handle the hot water supplied to the machine through the supply line H and it controls introduction of hot water into the machine. The cold water valve 69 may be like the hot water valve, except that it is in the cold water line J and controls the introduction of cold water into the machine. The inlet valve 70 controls flow of fluid from the mixing chamber C to the wash tank A and as shown in the drawings it may be a suitable quick acting or poppet type valve, located at the point of connection between the mixing chamber and the fluid connection D and provided with an operating stem 73. The dump valve 71 may be a suitable quick acting or poppet type valve located at and operable to open and close the opening 15 at the bottom of the tank A. The steam valve 72 may be a simple valve in the steam line K, where it enters the machine, operable to control introduction of steam into the machine.

The main or principal hydraulic control elements are an actuator 74 for the hot water valve 68, an actuator 75 for the cold water valve 69, an actuator 76 for the inlet valve 70, an actuator 77 for the dump valve 71, an actuator 78 for the steam valve 72, and an actuator 79 operatively coupled with a stop switch 80, the function and operation of which will be hereinafter described.

The actuator 74 for the hot water valve 68 may involve, primarily, a diaphragm type actuating device 81 operatively coupled to the valve 68, and a pilot valve 82 controlling the action of the device 81. In the preferred arrangement operating pressure for the actuator 74 is supplied through a pressure connection 83 communicating pressure from the hot water supply line H to the pilot valve 82. The actuator includes a fluid connection 84 from the pilot valve 82 to the diaphragm actuator 81. The pilot valve 82 is such that it may be operated to admit fluid under pressure from connection 83 to connection 84 at which time the device 81 operates to open the valve 68. A drain 85 is provided on the pilot valve 82 for conducting expended fluid to a drain pipe 86.

The actuator 75 for the cold water valve 69 may involve primarily a diaphragm type actuating device 88 or the like operatively coupled to the valve 69 and a pilot valve 89 controlling the actuating device 88. In the preferred arrangement operating pressure for the actuator 75 is supplied through a pressure connection 90 communicating pressure from the cold water supply J to the pilot valve 89. The actuator includes a fluid connection 91 from the pilot valve 89 to the diaphragm actuator 88. The pilot valve 89 is such that it may be operated to admit fluid under pressure from the connection 90 to connection 91 at which time the device 88 operates to open the valve 69. A drain 92 is provided on the pilot valve 89 for conducting expended fluid to the drain pipe 86.

The actuator 76 for the inlet valve 70 may include a diaphragm type operator 93 suitably connected with the stem 73 of the valve 70 and a pilot valve 94 controlling the action of the operator 93. The diaphragm type actuator or operator 93 is shown mounted above the mixing chamber and involves an operating rod 95 coupled to a diaphragm 96. The rod 95 is operatively coupled to the stem 73 of the valve 70 by a link 97 having one end pivoted to a fixed bracket 98 while the other end is pivotally connected to the upper end of stem 73. The arrangement is such that when the diaphragm 96 is moved upwardly the stem 73 is lifted opening valve 70. The pilot valve 94 is coupled with the supply line P by a suitable connection 99 while a connection 100 communicates pressure from the pilot valve 94 to a chamber 101 adjacent the diaphragm 96. The pilot valve 94 is such that it can be operated to a position where pressure from supply line P is communicated to connection 100 through the pilot valve. The pilot valve has a drain line 102 conducting expended fluid to the drain pipe 86.

The actuator 77 for the dump valve is shown as involving a cylinder and piston operator 103 operatively coupled with the dump valve 71 and a pilot valve 104 controlling the action of the operator 103. The particular dump valve and actuator therefor that I have illustrated in the drawings are the subject of Patent No. 2,382,562, entitled "Drain Valve for Washing Machines And The Like," issued August 14, 1945. Operating pressure is communicated to the pilot valve 104 from the supply line P by a pressure connection 105 and a suitable connection 106 connects the pilot valve 104 with the operating device 103. The pilot valve is such that it can be operated to a position as shown in the diagram where pressure from line P is supplied to the device 103. A drain connection 107 extends from the pilot valve 104 to handle expended fluid and conducts it to the drain pipe 86.

The actuator 78 for the steam valve 72 is shown as including a diaphragm type operator 109 operatively coupled with the valve 72 and a pilot valve 110 controlling the pressure of the device 109. The diaphragm device 109 is shown directly engaging the stem 111 of the valve 72 and the diaphragm 112 of the device 109 is normally held in a released position by a spring 113. A pressure connection 114 connects the pilot valve 110 with the supply line P and a suitable connection 115 connects the pilot valve 110 with the diaphragm device 109. The pilot valve is such that it can be operated to a position where pressure from line P is communicated to the device 109 above the diaphragm 112 to depress the diaphragm and thus open the valve 72. A drain 116 extends from the pilot valve 110 to the drain pipe 86.

From the foregoing description it will be noted that I have shown constructions such as to utilize pressure from the hot and cold supply lines H and J to actuate the diaphragm devices that operate the hot and cold valves, whereas I use a separate source of fluid pressure, that is supplied through the line P, to operate the pilot valves 94, 104 and 110. It will be apparent that a single source of operating pressure might be employed. However, since the valves 68 and 69 are large, heavy-duty valves requiring high pressure for satisfactory operation, and since the lines H and J preferably supply water at substantial pressure, it is preferred to use that pressure for the operation of these valves. The elements controlled by the pilot valves 94, 104 and 110 do not require high operating pressure or any substantial volume and consequently it is most practical to employ a separate source of operating pressure for these elements and this source may be at a pressure considerably lower than that handled by the valves 68 and 69.

The actuator 79 for the switch 80 is primarily in the form or nature of a float device, responsive to the liquid level in the mixing chamber C. The particular form of actuator illustrated in the drawings involves a float 117 located in the mixing chamber C and carried on the arm 118 of a lever pivotally mounted at 119. Arm 120 of this lever is coupled to a rod 121 that extends to the general vicinity of the switch 80 where it is coupled to a rocker 122, on a pivotal mounting 123.

The electrical control elements control current from a suitable power supply as, for instance, a power circuit carried by lines 130 and 131, and include, generally, a plurality of electromagnetic devices or solenoids. In the form of the invention illustrated the electrical control elements includes an operating solenoid 132 for the pilot valve 82 related to the hot water valve 68, a solenoid 133 for the pilot valve 89 related to the cold water valve 69, a solenoid 134 for the pilot valve 94 related to the inlet valve 70, a solenoid 135 for the pilot valve 110 related to the steam valve 72, and a solenoid 136 for the pilot valve 104 related to the dump valve 71. The electrical control elements further include a solenoid 137 for operating each latch 58 controlling a dump bucket 55. The electrical controls further involve electrical control units or mechanisms X, Y and Z, the control X being for the solenoids 132 and 133 and controlling them in unison, the control Y being for the solenoids 132 and 133 and controlling them separately, and the control Z being for the solenoid 135.

A further basic control element primarily electrical is the master control Q related to and dominating the action of all of the above-mentioned electrical control elements. A further electrical control element R is a power control controlling energization of the motor 50 as well as the drive of the master control Q.

It is preferred that the electrical system be such that certain elements operate on high voltage while others operate on low voltage. For example it is desirable that the motor 50 be operated by high voltage whereas the various other elements hereinabove referred to may advantageously operate under low voltage. In view of the desirability of both high and low voltage in the electrical system leads 140 are taken from the power lines 130, 131 and 132 carrying high voltage and enter the power control R. A transformer 141 is energized by the power lines 130 and 131 to energize the low voltage circuit of the system. One lead or line 142 from the transformer 141 may be considered as carrying one side of the low voltage circuit and enters the master control Q. The other line 143 carrying the low voltage circuit enters the power control R which is interposed between the transformer and various elements of the electrical system including a lead or line 144 which may be said to carry the other side of the low voltage circuit. The electrical system has been diagrammed in Figs. 31 and 32 to indicate the principal electrical elements connected as far as possible between the leads 142 and 144 carrying the two sides of the low voltage circuit.

The power control R involves, generally, a reversing switch 150 controlling motor 50 and handling the current supplied by the high voltage lines 140. An actuator 151 is provided for the reversing switch which may, in practice, be a motor driven reversing or switching mechanism normally in operation when the machine is operating and serving to intermittently operate the reversing switch 150 so that the motor M intermittently operates in opposite directions. The power control R further includes a master or primary switch 152 controlling the line 143 to a selector switch 153 included in the power control.

The selector switch controls primarily the connection between line 143 and the lead 144 to which numerous elements of the electrical system are connected. The selector switch or switching mechanism may include a plurality of switches such as the switches 155ª, 155ᵇ, 155ᶜ, 155ᵈ, 155ᵉ and 155ᶠ as indicated in Fig. 32. These switches are under control of the single operating element 155 which element is movable into five different positions which may be termed, an on position 156, an off position 157, a nonreversing position 158, a forward position 159 and a reverse position 160. Assuming the primary switch 152 to be closed, the entire machine is out of operation when the control element 155 is in the off position shown in Fig. 31, except that it may be operated by an adjusting control that will be hereinafter described. When control 155 is in the off position all switches of switch 153 are open. When the control 155 is in the on position the machine is fully energized and switches 155ª, 155ᵇ, 155ᶜ, and 155ᶠ are closed thereby operating motor 191 of control Q, the motor of the actuator 151 for the reversing switch, operating element 164 of a brake 165 releasing motor 50 and closing the circuit to line 144. When the control element 155 is in the nonreversing position switches 155ᶜ and 155ᵈ are closed energizing the circuit carried by lines 163 which supply the electrical operating element 164 of the brake 165 and energizing the reversing switch 150 so that the motor 50 operates in one direction only. The brake 165 may be a spring operated brake on the motor 50 and is desirable as a means of positively locking the barrel E against operation. The operating element of the brake may be electrically energized thereby releasing the brake so that the motor is free to operate.

The forward position 159 or the reverse position 160 of the selector switch conditions the adjusting control which involves a circuit between the selector switch 153 and the reversing switch 150 carried by lines 170 and 172 controlled by switches 155ᵉ and 155ᵈ, respectively. The circuit through line 170 may be completed when the operator 155 is in position 159 closing switch 155ᵉ while the circuit through line 172 may be completed when the operator 155 is in the position 160 closing switch 155ᵈ. A line 171 connects to lead 142. The line 171 is common to the circuits through the lines 170 and 172 and includes a switch 180 preferably a button type switch to be manually operated. A line 180ª connects switch 180 to the circuit controlling operating element 164 of the brake so that when switch 180 is closed the brake is released. Assuming the operator 155 to be either in the position 159 or 160 closing switches 155ᵉ or 155ᵈ, respectively, the motor M can be operated in one direction or the other, depending upon the selection established by the switch 153 upon the operator completing the circuit by closing switch 180. The adjustment control thus described is, in effect, a by-pass around the operator 151 and is operable when all other parts or elements of the system are de-energized by reason of the operator 155 of switch 153 being removed from the on position.

The primary switch 152 is preferably related to or operated by the closures 16 of the wash tank A to be opened when these closures are opened. The switch 152 may be located at the end of the tank 10 remote from the drive for the barrel and the operating element 152ª of switch 152 may be engaged by a part on one closure 16 when that closure is in the closed position so that switch 152 is only closed when that closure is in the closed position. The other closure of the tank is held in the closed position by the closure which operates the switch 152 through interengaging parts 16ª on the closures as shown in Fig. 1 of the drawings. With this arrangement, when the closure that operates switch 152 is in the closed position, it not only closes switch 152 but holds the other closure in the closed position, and to open the machine the closure controlling switch 152 must be opened and the switch 152 opened before the second closure can be opened.

The master control Q is a means providing for pre-setting of the machine so that it functions in a predetermined manner in response to the master control. The particular master control illustrated in the drawings, is a switching mechanism characterized by a control drum 190 driven by a motor 191 and a plurality of followers 192 that bear or track on the drum 190 and control switches so that the switches are operated as the followers drop into apertures or cut-outs 193 provided in the drum. The cut-outs are provided in the drum so that they bear a definite relationship to each other and are of predetermined extent so that the swtiches of the master control are operated in the desired sequence and remain operated for the desired lengths of time. The particular master control employed in carrying out the present invention may involve the features of construction which are the subject of Patent No. 2,306,056, entitled "Control Means For Washing Machines And The Like," issued December 22, 1942 and Patent No. 2,333,248, entitled "Control Element," issued November 2, 1943.

As shown in the diagram, Fig. 31, the master control involves a plurality of drum controlled switches including a switch 199 controlling each solenoid 137 for the latches 58 controlling the dump buckets 55, a switch 200 controlling operation of the operating motor 201 included in control X, a switch 202 controlling the motor 203 included in control Y, a switch 204 controlling a motor 205 included in control Z, a switch 206 controlling the circuit to solenoid 134 that controls actuator 76 and a switch 207 controlling the circuit to solenoid 136 that controls actuator 77.

The control X may be termed an off and on control for the solenoids 132 and 133 controlling valves 68 and 69, respectively, and it normally operates so that the solenoids 132 and 133 act in synchronism or together so that both are energized or both are de-energized. It is significant, however that the action of the control X is, in accordance with my invention, modified by the action of the control Y as will be hereinafter described.

The control X in the form shown in the drawings includes the switch 80 which may be termed a cut-out switch, and means operable to adjust the relationship of switch 80 to the hydraulic actuator 79. In the particular case illustrated the cut-out switch 80 is of conventional construction involving a projecting operating button 208 adapted to be engaged and operated by an element 209 of the hydraulic actuator 79. The element 209 is shown in the form of a push arm having a pivotal mounting 210 and operatively coupled with the rocker 122 by a link 211. The relationship of parts is such that as the float 117 moves up in the mixing tank the rod 121 moves down actuating the rocker 122 and moving the arm 209 toward the switch 80.

The means provided for shifting the switch 80 relative to the arm 209 involves, generally, a shiftable carriage preferably a pivoted carriage 212 on which the switch 80 is fixed with the operating part 208 faced toward the push arm 209. The control X further includes an electric drive which preferably involves the electric motor 201 preferably a synchronous motor and a drive from the motor to the carriage 212. I have shown a gear drive between the motor 201 and the carriage 212 and I have further shown a releasable gear drive enabling the carriage to be released from or freed of the motor.

The particular mechanism illustrated in the drawings involves a pinion 216 on the motor shaft meshing with a drive gear 217 normally engaged with teeth 218 formed on the carriage 212 concentric with the axis thereof. The carriage 212 is shown supported by the pivotal mounting 210 that carries the arm 209. The drive gear 217 is pivotally mounted on a shiftable control arm 220 which arm is preferably pivoted on the shaft of motor 201 and is shiftable to a position where the gear 217 is out of engagement with the teeth 218. An electro-magnetic control is provided for the arm 220 which control is shown as including a coil or winding 222 in a circuit controlled by the switch 206 of the master control Q.

The control X as hereinabove described is such that its motor 201 is energized through the switch 200 of the master control for a period determined by the master control or by the length of an opening 193 governing the action of switch 200. As the motor 201 operates the switch 80 moves away from arm 209 with the result that the longer the motor 201 operates the farther the arm 209 has to move before it operates the switch 80 to open it. It therefore will be apparent that the length of time that the motor 201 operates determines the quantity of water that will accumulate in the mixing chamber C before the float of means 79 moves up to a position where switch 80 is opened. When switch 80 is opened the circuits to solenoids 132 and 133 are opened and the pilot valves are released with the result that the valves 68 and 69 are closed.

When the switch 206 of the master control is closed the winding 222 of control X is energized operating arm 220 so that the drive from the motor 201 to the carriage 212 is released. When this occurs a spring 230 immediately operates the carriage to its initial or starting position such as is shown in Fig. 19. The spring may be a helical spring having one end fixed at 231 while its other end is attached to a hub 233 on the carriage.

The control Y is, in effect, a thermal control as it determines the temperature of the water delivered to the mixing chamber, and to accomplish this it effects individual operation or control of the valves 68 and 69. The control Y is responsive to the master control Q and is, in effect, connected between the control X and the hot and cold valves 68 and 69.

The control Y coordinates action of the master control Q with that of a thermal control 250 which is directly responsive to the water being delivered to the mixing chamber. The thermal control 250 may involve a thermally responsive element 251 located to be affected by the temperature of the water passing to the mixing chamber. It is preferred to locate the element 251 in the head 64. The thermal means 250 further includes an operating unit 253 at the unit Y which operating unit involves a case 254 that may be mounted in a fixed position and which carries an actuator 255 that moves in response to operation of the element 251. A suitable operating connection 256 is provided between the element 251 and the operating unit 253.

The unit Y, as shown in the drawings, involves two cut-out switches 260 and 261, each connected to solenoid 132 and to solenoid 133. Each cut out switch of control Y is preferably a snap switch and has a fixed contact 262 connected to solenoid 132 controlling the hot water valve and a fixed contact 263 connected to solenoid 133 controlling the cold water valve.

A connection 264 is provided between the contacts 262 of the two switches and a lead 265 extends from the connection 264 to the solenoid 132. A connection 266 is provided between contacts 263 and a lead 267 extends from connection 266 to solenoid 133. Switch 260 has a movable contact 268 shiftable between contact 262 and contact 263 of switch 260 while switch 261 has a shiftable contact 269 shiftable between contact 262 and 263 of switch 261. A line 270 leads from control unit X where it is controlled by the switch 80 and connects to the movable contacts of switches 260 and 261.

The control unit Y further involves operating means for the switches 260 and 261 which operating means is, in accordance with my invention, coordinated with the operator 253 of the thermostatic control responsive to the temperature of water delivered to the mixing chamber. In the particular form of the invention illustrated the switches 260 and 261 are carried by a stationary support 271 and the operating means for the switches involves a lever 273 carried on a pivot pin 272 which lever has an arm 273ᵃ for operating the switches and an arm 274 cooperatively related to the part 255 of the actuator 253. The arm 273ᵃ is provided with a tip 275 opposite the shiftable contact 268 of switch 260 and is provided with a tip 276 opposite the shiftable contact 269 of switch 261. The tips 275 and 276 are adjustable relative to each other. In the case illustrated the tip 275 is fixed on arm 273ᵃ while tip 276 is adjustable through a threaded shank 280. The cooperative relationship between the arm 274 of the pivoted operating lever and the part 255 is preferably through an adjustable element such as an adjusting screw 281, the screw being shown carried by the arm 274 so that it normally bears on or abuts the end of part 255.

The operating means of the unit Y, as above described is related to the master control Q and includes adjusting means under control of the master control Q. The particular adjusting means for the operating means of control Y shown in the drawings involves a rotatable cam 285 having a cam face 286 of suitable contour cooperating with a follower 287 on a pivoted carrier 288 which supports the pivotal mounting 272 for the lever 273. The carrier 288 is carried by a pivotal mounting 290 located at or close to the point of cooperative engagement between the adjusting screw 281 and the member 255. A suitable yielding means such as a spring 291 engages the carrier 288 and normally yieldingly holds the follower 287 in cooperative engagement with the cam face 286. The cam 285 is fixed on a cam shaft 295.

The adjusting means of control Y further includes the motor 203 which is preferably a synchronous motor the circuit of which is under control of switch 202 of the master control Q. The motor 203 is operatively coupled to the cam shaft 295. The particular couple or drive shown in the drawings involves a pinion 300 on the shaft 301 of motor 203. The pinion 300 engages and operates a drive gear 302 which has driving engagement with a series of teeth 303 on a segment 304 fixed on the cam shaft 295.

The drive just described is preferably a releasable drive under control of the master control Q. In the particular case illustrated the release of the drive is gained by mounting the drive gear 302 on a pivotally mounted arm 310 which arm is under control of a solenoid 311. The arm 310 is shown pivotally supported by the motor shaft 301 and is normally held down by gravity in a position where the gear 302 has driving engagement with the segment 304. When the solenoid 311 is energized as by closing of switch 206 of the control Q the arm 310 is lifted disengaging the gear 302 from the segment 304. Whenever the segment 304 is released it is returned to its normal or unactuated position by a spring 312 which may be a helical spring having one end fixed to a frame part at 313 while the other end is fixed to hub 314 on the segment 304.

With the mechanism just described the length of the cut-out 193 provided in the control cylinder of the master control Q for the control of switch 202 governs the extent that the cam 285 is rotated from its normal unactuated position, as shown in Fig. 25. As the cam 285 is operated from its normal position it depresses the carrier 288 in the direction indicated by the arrow in Fig. 25, thus moving the tips of the lever arm 273 away from the movable contacts of the switches 260 and 261, making it necessary for the actuator 253 of the thermal means to move the lever 273 a greater distance before operating either of the switches than is the case if the cam is unactuated. The cam face 286 is such that the more the cam is rotated from its normal position the greater must be the operation of lever 273 by the actuator 253.

The control Y involves, in adddition to the cutout switches 260 and 261, a disconnect switch 315 and a selector switch 316 together with operating means for the switches 315 and 316. The disconnect switch 315 is in the line 265 from the switches 260 and 261 to the solenoid 132 controlling the hot water valve 68 so that when switch 315 is open the hot water valve 68 cannot open. The selector switch 316 is a double throw switch in series in the line 270 between switch 80 and the switches 260 and 261.

The switch 316 has two opposed stationary contacts 320 and 321 and a movable contact 322. The contact 320 is connected with line 267 from contacts 263 of switches 260 and 261 by connection 323. Contact 321 is connected with the movable contacts 268 and 269 of the switches 260 and 261 by a section of the connection 270 extending from switch 316 to the switches 260 and 261. The switch 316 is shown in diagram, Fig. 31, in what may be termed an unactuated position where the movable contact 322 connected with switch 80 is engaged with the contact 320 so that a circuit is completed from switch 80 through line 323 to the solenoid 133 controlling cold water valve 69 so that under that condition valve 69 is opened. When switch 316 is operated contact 322 engages contact 321 closing the circuit from switch 80 through connection 270 to the movable contacts of switches 260 and 261 so that circuits to the solenoids of the hot and cold water valves are determined by the setting of the switches 260 and 261.

The operating means provided for the switches 315 and 316 may be related to or incorporated in the mechanism of unit Y hereinabove described. In the particular case illustrated the operating means for switches 315 and 316 is related to or incorporated with the adjusting means hereinabove described for adjusting the relationship between the thermal actuator 253 and the switches 260 and 261. The particular mechanism illustrated involves cam parts 330 and 331 on the segment 304 which cam parts are so located on the segment as to engage shiftable elements 332 and 333 of the switches 315 and 316, respectively. The relationship of parts is such that when the segment 304 is in the unactuated position with cam 285 in the unactuated position, switch 315 is open, whereas the contact 322 of switch 316 is in engagement with contact 320 of that switch.

Through the switches 315 and 316 and the setting of these switches and their control through the structure just described, whenever the adjusting mechanism of control Y is unactuated, that is, when segment 304 and cam 285 are in the unactuated position, switch 315 is open and switch 316 is closed only to the solenoid 133 of the cold water valve, so that the cold water valve only may be opened, it being impossible for the hot water valve to then open. The control Y being primarily a thermal control, or at least a thermally responsive control, it becomes effective as a thermal control and responsive to the thermostatic control means 250 whenever and as soon as the adjusting means or the cam 285 has been advanced from its normal position, as by operation of motor 203 through closing of switch 202 of the master control Q. As soon as the adjusting means of the thermal control Y is operated the operating means of switches 315 and 316 release switches 315 and 316 through movement of the cam parts 330 and 331 out of engagement with the switch parts 332 and 333. When this occurs switch 15 closes and the contact 22 of switch 316 engages contact 321 of switch 316, whereupon the circuit to the solenoid 132 controlling the hot water valve 68 is closed through the switches 260 and 261 and by reason of the setting of the switches 260 and 261, as shown in the diagram, Fig. 31, the circuit to the solenoid 133 is open.

It thus follows that immediately that the adjusting means of control Y goes into operation rendering control Y responsive to the thermostatic means 250, hot water only is supplied through the connection leading from the mixer to the mixing chamber. Hot water thus supplied immediately contacts the thermally responsive element 251 of means 250 resulting in operation of the actuating part 255 of the actuator 253 with the result that lever 273 of the operating means for switches 260 and 261 is operated. As the lever 273 is operated under the influence of the thermal actuator 253 one of the tips of lever 273ª engages and operates one of the movable contacts of one of the switches 260 and 261. With the setting illustrated in Fig. 26 the tip 276 will first contact and operate the movable element 269 of switch 261. When this occurs, that is, when the movable contact of switch 261 is actuated switch 261 is reversed from the position shown in the diagram, Fig. 31, bringing contact 269 into engagement with contact 263 closing the circuit through connection 267 to the solenoid 133 controlling the cold water valve 69, thus opening the cold water valve 69 while the hot water valve 68 is still open.

The amount of cold water thus introduced into the mixer may temper the water issuing from the mixer with the result that the thermally responsive element 251 causes operation of the actuator 253 allowing the valves to remain open. Should the amount of cold water thus admitted when both valves are open be greater than is that corresponding to the setting of the adjusting means responsive to switch 202 of the master control Q the part 255 of actuator 253 will withdraw or react and spring 340 will retract the tip 276 from switch 261 allowing switch 261 to operate back to the initial position indicated in the diagram, Fig. 31, whereupon hot water only will again be supplied to the mixer. The adjustment of the control Y as established by the master control Q through switch 202 may be such that the hot water valve will remain open while the cold water valve will be intermittently turned on and off in the manner just described.

Should the temperature of the water issuing from the mixer after switch 261 has been operated by tip 276 continue to rise, and should it rise beyond a value represented by the adjustment of control Y, as represented by operation effected through closing of switch 202, then the tip 275 of lever arm 273ª will engage and operate the element 268 of switch 260 while the element 269 of switch 261 is operated. This results in both switches 260 and 261 being operated from the position shown in the diagram, Fig. 31, with the result that the circuit to the solenoid 132 controlling the hot water valve is opened through the switches 260 and 261 while the solenoid 133 controlling the cold water valve is closed through the switches 260 and 261. Under the last named condition cold water only will enter the mixer and as a result the thermally responsive element 251 will cause operation or retraction of the part 255 of actuator 253 to such an extent that the lever arm 273ª will retract from the switches 260 and 261 first moving tip 275 away from element 268 of switch 260 establishing the condition where hot and cold water both are admitted to the mixer and if this does not rectify the condition and the temperature is still too cold then the arm 273ª may move away from the switches until tip 276 disengages from element 269 of switch 261 under which condition hot water only is supplied to the mixer.

From the foregoing description it will be apparent that through the control Y responsive to the master control Q I normally gain cold water only, but as soon as the master control Q operates by closing switch 202 to actuate the adjusting means embodied in control Y, I establish an adjusted condition of control Y which the switches of control Y respond to, to the end that these switches open and close in response to or as determined by the setting gained through the adjusting means and the action of the thermal means, all with the result that the hot and cold water valves are either opened independently or jointly.

The control Z serves primarily as a control for the pilot valve that controls the action of the pilot 110 that controls the steam valve 72, this control being effected through solenoid 135 and being responsive to an adjustable thermal control. The adjustment of the thermal control is effected through mechanism of the control Z.

The thermal control involves, generally, a thermally responsive element 350 at or in the tank, preferably in the bottom of tank 10, as shown in Fig. 5 of the drawings. The thermal control further involves an operating unit 351 in or related to the control Z and connected with the responsive element 350 by a suitable connection 352. The thermal actuator 351 operated from the thermal element 350 through the connection 352 actuates a switch 355 of control Z.

The actuator 351 includes adjuster 356 responsive to the master control Q. By varying the rotative position of adjuster 356 the point or temperature at which the switch 355 is closed may be varied. The control Z is responsive to the master control Q through switch 204 and involves a motor 205 preferably a synchronous motor. The control Z involves a connection between the motor 205 and the operating unit 351 through which the position or adjustment of the adjuster 356 is governed or set, through operation of motor 205, the motor being responsive to the control Q through switch 204. The particular mechanism that I have shown in the drawings involves a shaft 360 rotated from the motor 205 and having driving engagement with the adjuster 356. The driving engagement illustrated in the drawings includes a head 361 on the shaft 360 which head has a recess 362 receiving a projection 363 on the adjuster establishing driving engagement between the head and the adjuster.

The drive provided between the motor 205 and the shaft 360 is shown as including a pinion 366 on the motor shaft 367. The pinion engages and drives a gear 368 which has driving engagement with a series of teeth 369 on a segment 370 fixed on shaft 360. The drive just described is preferably a releasable drive and a spring 371 is provided to normally return the segment to an unactuated position when the drive is released. The spring 370 is shown as a helical spring having one end secured at 372 to a fixed support and having its other end secured at 373 to a hub 374 on the segment 370.

The means provided for releasing the drive above described involves a shiftable arm 380. The arm is preferably pivoted on the motor shaft 367 and an electromagnetic means or solenoid 381 is provided for shifting the arm 380 to move the gear 368 out of engagement with the teeth 369. The solenoid 381 is under control of a switch 207 of the master control Q.

The control Z further includes a safety switch 385 in series with the switch 355 which controls the solenoid 135 operating the pilot valve 110 controlling the steam valve 72. The safety switch 385 is preferably related to the mechanism above described so that it is open when the mechanism is unactuated or is in the normal position under influence of spring 371. In the particular case illustrated the shiftable element 390 of the safety switch 385 is shown moved to an open position by a cam part 391 on the segment 370. The cam part is so located as to open switch 385 when the segment is in the unactuated position.

From the foregoing description it will be apparent that the control Z is such that the adjuster 356 of the thermal means may be moved to various positions or may be variously adjusted through the mechanism of control Z, depending upon the extent to which motor 205 is operated under control of the master control Q. If the cylinder of master control Q is such as to have an opening allowing motor 205 to operate but a short period of time, then the segment 370 will be operated only a limited amount and the adjuster 356 will be actuated only a limited amount, whereas if the motor 205 runs for an extended period of time, then the quadrant 370 will be moved a substantial amount and the adjuster 356 set up a substantial amount. It will be apparent that the connection and relationship of parts is such that the steam valve 72 opens admitting steam into the wash tank whenever the temperature in the tank drops below a predetermined value, that is, below the value determined by the control Z which is responsive to the master control Q.

In practice steam is admitted into the tank A to increase the temperature thereof and since the water level may vary considerably in the tank I preferably locate the steam fittings 400 through which steam is admitted into the tank at the bottom thereof. The fittings 400 are preferably secured to the underside of the tank and receive steam from valve 72 through a steam pipe 401 connected to that valve. Each fitting 400 covers an opening 402 at the bottom of the tank A. The opening 402 is substantially greater in capacity that the capacity of the pipe 401 so that steam is injected into the tank A under reduced pressure. A shield 403 is provided in the tank to cover opening 402 and directs steam horizontally in the tank so that it thoroughly mingles with the water in the tank.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A washing machine including, a tank adapted to carry liquid, a rotary clothes container carried by and operable in the tank, water supply means adapted to deliver water to the tank including, a water mixer, a flow line extending from the mixer to the tank, a hot water supply line connected with the mixer to supply hot water thereto, a cold water supply line connected with the mixer to supply cold water thereto, a hot water control valve in the hot water supply line, and a cold water control valve in the cold water supply line, actuators for the valves, a quantity control directly connected to and governing said actuators to operate the valves in unison to pass a predetermined quantity of water to the tank, and a temperature control including a thermally responsive element in the flow line, the temperature control being directly connected to and governing the actuators simultaneously with the quantity control to modify the action of the quantity control by opening and closing said valves individually during operation of the quantity control to establish the said quantity of water at a predetermined temperature.

2. A washing machine including, a tank adapted to carry liquid, a clothes container carried by and operable in the tank, a water supply means adapted to deliver water from hot and cold supply lines to the tank including a hot water control valve in the hot water supply line, a cold water control valve in the cold water supply line, and a single fluid connection between the valves and tank handling water passed by the valves and including a water mixer and a flow line from the mixer to the tank, individual actuators engaged with and operating the valves, a quantity control directly engaging and operating the actuators so they govern said valves in unison to pass a predetermined quantity of water, and a temperature control acting simultaneously with the quantity control and operating the actuators to open and close said valves individually during operation of the quantity control and thereby establish the said quantity of water at a predetermined temperature, the temperature control including a thermostat in the flow line of the fluid connection.

3. A washing machine including, a tank adapted to carry liquid, a clothes container supported by and operable in the tank, water supply means adapted to deliver water from hot and cold water supply lines to the tank including, a hot water control valve in the hot water supply line, a cold water control valve in the cold water supply line, a water mixer connected with the valves and receiving water therefrom, and a conduit connected to the mixer and conducting water from the mixer to the tank and including a riser extending up from the mixer, individual actuators directly connected to and operating the valves, a quantity control directly connected to and governing said actuators to operate the valves in unison for passage of a predetermined quantity of water to the tank, and a temperature control directly connected to and operating said actuators to open and close said valves individually during operation of the quantity control and thereby establish the said quantity of water at a predetermined temperature, the temperature control including a thermostat in said conduit at the upper end of the riser.

4. A washing machine including, a tank adapted to carry liquid, a clothes container carried by and operable in the tank, water supply means adapted to deliver water from hot and cold water supply lines to the tank and including, a hot water control valve in the hot water supply line, a cold water control valve in the cold water supply line, and a single flow line from the valves to the tank, an actuator directly connected to each valve, a quantity control directly connected to and governing said actuators so they operate the valves in unison to pass a predetermined quantity of water, a variable temperature control directly connected to and governing the actuators to open and close said valves individually during operation of the quantity control to establish the said quantity of water at a predetermined temperature, the temperature control including a thermally responsive element in the flow line responsive to fluid in the flow line, and a master control directly connected to and governing the quantity control and the temperature control and acting to cut the quantity control into and out of operation to set the temperature control.

5. A washing machine including, a tank adapted to carry liquid, a clothes container operable in the tank, a water supply means adapted to deliver water to the tank from hot and cold water supply lines and including, a hot water control valve in the hot water supply line, a cold water control valve in the cold water supply line, and an inlet valve admitting water passed by the control valves to the tank, an outlet valve passing water from the tank, an actuator connected to and operating each of the valves, a quantity control directly connected to and governing the actuators so said valves operate in unison to pass a predetermined quantity of water, and a temperature control directly connected to and governing the actuators to open and close said valves individually during operation of the quantity control to establish the said quantity of water at a predetermined temperature, and a master control directly connected to and governing the quantity control, the temperature control, the actuator of the inlet valve, and the actuator of the outlet valve.

6. A washing machine including, a tank adapted to carry liquid, a clothes container operable in the tank, a water supply means adapted to deliver water from hot and cold water supply lines to the tank including, a hot water control valve in the hot water supply line, a cold water control valve in the cold water supply line, a mixing chamber connected with and receiving water from the said control valves, and an inlet valve admitting water from the chamber to the tank, an outlet valve at the bottom of the tank passing water from the tank, individually operable material containers operable to deposit material into the chamber, separate actuators connected to the valves and containers, a quantity control directly connected to and governing the actuators for said control valves so the valves operate in unison to pass a predetermined quantity of water, and a temperature control directly connected to and governing the actuators for the control valves so they open and close said control valves individually during operation of the quantity control to establish the said quantity of water at a predetermined temperature, and a master control directly connected to and governing the quantity control, the temperature control, and the actuators for the inlet valve, the outlet valve, and the containers.

7. A washing machine including, a tank adapted to carry liquid, a clothes container supported by and rotatable in the tank, a water supply means adapted to deliver water from hot and cold water supply lines to the tank and including a hot water control valve in the hot water supply line, a cold water control valve in the cold water supply line, a fluid pressure operated actuator connected to the hot water control valve, a fluid pressure operated actuator connected to the cold water control valve, a mixing chamber connected to and receiving water from said valves, and an inlet valve passing water from the chamber to the tank, an outlet valve passing water from the tank, a fluid pressure operated actuator connected to the inlet valve, a fluid pressure operated actuator directly connected to the outlet valve, and an electric control system directly connected to and governing the actuators and including, a quantity control operating the actuators of the control valves in unison, a temperature control operating the actuators of the control valves individually, and a master control putting the quantity control into and out of operation, adjusting the temperature control, and coordinating operation of the actuators of the inlet and outlet valves.

8. A washing machine including, a wash tank, water supply means adapted to deliver water from hot and cold water supply lines to the tank and including, a clothes carrier rotatable in the tank, a hot water control valve in the hot water supply line, a cold water control valve in the cold water supply line, a fluid pressure operated actuator directly connected to and operating the hot water control valve, a fluid pressure operated actuator directly connected to and operating the cold water control valve, a mixing chamber directly connected with and receiving water from said valves, and an inlet valve between the chamber and tank passing water from the chamber to the tank, an outlet valve at the bottom of the tank passing water from the tank, a fluid pressure operated actuator connected to and operating the inlet valve, a fluid pressure operated actuator connected to and operating the outlet valve, material containers at the chamber operable to discharge material into the chamber, fluid pressure operated actuators connected to and operating the containers, and an electric control system connected to and governing the operator of the several actuators and including, a quantity control operating the actuators of the control valves in unison, a temperature control operating the actuators of the control valves individually, and a master control putting the quantity control into and out of operation, adjusting the temperature control, governing the actuators for the containers, and coordinating operation of the actuators of the inlet and outlet valves.

9. A washing machine including, a wash tank, a clothes container rotatable in the tank, a water supply means adapted to deliver water from hot and cold water supply lines to the tank and including, a hot water control valve in the hot water supply line, a cold water control valve in the cold water supply line, an actuator directly connected to and operating the hot water control valve, an actuator directly connected to and operating the cold water control valve, a mixer having each valve directly connected thereto and receiving water passed by the valves, a duct conducting water from the mixer, and an electric control system directly connected to and governing the actuators and including, a quantity control operating the actuators in unison, and a temperature control including a thermostat in the duct and operating the actuators individually in response to the thermostat.

10. A washing machine including, a tank adapted to carry water, a clothes container rotatable in the tank, water supply means adapted to deliver water from hot and cold water supply lines to the tank and including a hot water control valve in the hot water supply line, a cold water control valve in the cold water supply line, and a single flow line from said valves to the tank, a hydraulic actuator directly connected to and operating the hot water control valve, a hydraulic actuator directly connected to and operating the cold water control valve, a quantity control directly connected to and operating the actuators in unison, and a temperature control directly connected to and operating the actuators individually and including a thermostat in the said single flow line, the actuators including, pilot valves responsive to the controls and fluid pressure connections from said lines to the pilot valves.

11. A washing machine including, a tank adapted to carry water, a clothes container rotatable in the tank, water supply means adapted to deliver water from hot and cold water supply lines to the tank and including a hot water control valve in the hot water supply line, a cold water control valve in the cold water supply line, an actuator directly connected to and operating the hot water control valve, an actuator directly connected to and operating the cold water control valve, a mixing chamber connected to and receiving water from said valves, and an inlet valve passing water from the chamber to the tank, an outlet valve passing water from the tank, an actuator directly connected to and operating the inlet valve, an actuator directly connected to and operaing the outlet valve, and a control system connected to and operating each of the actuators and including, a quantity control operating the actuators of the control valves in unison, a temperature control operating the actuators of the control valves individually, the actuators for the inlet and outlet valves each including a pilot valve, a supply of operating fluid, and means delivering operating fluid from said supply to the actuators of the inlet and outlet valves, and means delivering fluid from the said lines to the actuators of the control valves.

12. A washing machine including, a tank adapted to carry water, a clothes container rotatable in the tank, water supply means adapted to deliver water from hot and cold water supply lines to the tank and including a hot water control valve in the hot water supply line, a cold water control valve in the cold water supply line, an actuator directly connected to and operating the hot water control valve, an actuator directly connected to and operating the cold water control valve, a mixing chamber connected with and receiving water from said valves, and an inlet valve passing water from the chamber to the tank, an outlet valve at the bottom of the tank passing water from the tank, an actuator directly connected to and operating the inlet valve, an actuator directly connected to and operating the outlet valve, and a control system connected to and operating each of the actuators and including, a quantity control for operating the actuators of the control valves in unison, a temperature control operating the actuators of the control valves individually, the actuators for the inlet and outlet valves each including a pilot valve, a supply of operating fluid, means delivering operating fluid to the pilot valves of the actuators of the inlet and outlet valves, means delivering fluid from the said lines to the actuators of the control valves, and a master control putting the quantity control into and out of operation, adjusting the temperature control, and coordinating operation of the actuaors of the inlet and outlet valves.

13. A washing machine including, a tank adapted to carry liquid, a clothes carrier operable in the tank, water supply means adapted to deliver water from hot and cold water supply lines to the tank and including, a hot water control valve in the hot water supply line, a cold water control valve in the cold water supply line, a mixing chamber receiving water from the valves, an actuator directly connected to and operating each of said valves, and a control system connected to and operating each of the actuators and including, a quantity control governing said valves in unison to pass a predetermined quantity of water, a temperature control opening and closing said valves individually during operation of the quantity control to establish the said quantity of water at a predetermined temperature, and a motor driven master control governing the action of the quantity control and the temperature control, the quantity control including, a float in the chamber and operated by water in the chamber and a switch adapted to control the valve actuators and having shiftable cooperating contacts one connected to and shifted in response to the master control and the other connected to and shifted in response to the float.

14. A washing machine including, a tank adapted to carry liquid, a clothes carrier operable in the tank, water supply means adapted to deliver water to the tank and including, a hot water supply line, a cold water supply line, a hot water control valve in the hot water supply line, a cold water control valve in the cold water supply line, a mixing chamber, a duct receiving water from the valves and delivering it to the chamber, an actuator directly connected to and operating each valve, and a control system connected to and operating each actuator including, a quantity control operating the actuators to govern said valves in unison to pass a predetermined quantity of water, a temperature control operating the actuators to open and close said valves individually during operation of the quantity control to establish the said quantity of water at a predetermined temperature and including a thermostat in said duct, and a master control governing the action of the quantity control and the temperature control, the quantity control including a float in the mixing chamber operated by water therein and a switch adapted to control the valve actuators and having shiftable cooperating contacts one connected to and shifted in response to the master control and the other connected to and operating in response to the float.

15. A washing machine including, a tank adapted to carry liquid, a clothes carrier carried by and operable in the tank, water supply means adapted to deliver water to the tank and including, a hot water supply line, a cold water supply line, a hot water control valve in the hot water supply line, a cold water control valve in the cold water supply line, a liquid mixing chamber located to discharge by gravity into the tank, a water mixer connected with and receiving water from the valves, and a flow line connected to the mixer and conducting water from the mixer to the chamber, an actuator connected to and operating each valve, and a control system connected to and operating the actuators including a quantity control operating the actuators to govern said valves in unison to pass a predetermined quantity of water, a master control for the quantity control putting it into and out of operation, and a temperature control for said actuaors whereby they open and close said valves individually during operation of the quantity control to establish the said quantity of water at a predetermined temperature and including a thermostat in the flow line, the quantity control including, a float mounted in the mixing chamber to be operated by liquid therein and a switch governing the valve actuators and having shiftable cooperating contacts one shifted in response to the master control and the other in response to the float.

16. A washing machine including, a tank adapted to carry liquid water supply means adapted to deliver water to the tank and including, a hot water supply line, a cold water supply line, a mixing chamber adapted to receive water from said supply lines and to deliver it to the tank, a hot water control valve in the hot water supply line, a cold water control valve in the cold water supply line, actuators connected to and operating said valves, a variable quantity control connected to and operating the actuators to open said valves in unison to pass a predetermined quantity of water, and a temperature control connected to and operating said actuators to open and close said valves individually during operation of the quantity control to establish the said quantity of water at a predetermined temperature, and a variable control connected to and operating the quantity control and including, a switch with cooperating variable elements one varied by a master control responsive to a preset record and one varied by a float in the mixing chamber.

17. A washing machine including, a tank adapted to carry liquid, a clothes carrier operable in the tank, a water supply adequate to deliver water to the tank and including, a hot water supply line, a cold water supply line, a hot water control valve in the hot water line, a cold water control valve in the cold water line, a steam supply line connected to the tank, a steam control valve in the steam line, an actuator connected to and operating each valve, and a control system connected to and operating each of the actuators including, a quantity control operating the actuators to govern the water valves in unison to pass a predetermined quantity of water, an adjustable temperature control connected to and operating the actuators open and close the water valves individually during operation of the quantity control to establish the said quantity of water at a predetermined temperature, a master control connected to the quantity control and to the temperature control and cutting the quantity control into and out of operation and setting the temperature control, and a control connection to and operating the actuator for the steam valve and including a circuit with a switch having cooperative variable elements one governed by the master control, and a thermal means responsive to the temperature of water in the tank governing the other element.

HERBERT HARVEY.

References Cited in the file of this patent

UNITED STATES PATENTS

| Number | Name | Date |
|---|---|---|
| 1,716,692 | Gundlack | June 11, 1929 |
| 1,779,914 | Packwood | Oct. 28, 1930 |
| 1,897,435 | McKnight | Feb. 14, 1933 |
| 1,924,038 | Herbsman et al. | Aug. 22, 1933 |
| 1,929,536 | Schulte | Oct. 10, 1933 |
| 1,987,709 | Riley | Jan. 15, 1935 |
| 1,992,581 | Reeder | Feb. 26, 1935 |
| 2,036,115 | Branch | Mar. 31, 1936 |
| 2,053,932 | Zimarik | Sept. 8, 1936 |
| 2,062,516 | Jones | Dec. 1, 1936 |
| 2,254,269 | Clark | Sept. 2, 1941 |
| 2,295,518 | Meuer | Sept. 8, 1942 |
| 2,313,928 | Dyer | Mar. 16, 1943 |
| 2,325,406 | Johnson | July 27, 1943 |
| 2,346,259 | Hutchings | Apr. 11, 1944 |
| 2,347,190 | Geldhof | Apr. 25, 1944 |
| 2,356,816 | Breckenridge | Aug. 29, 1944 |
| 2,372,770 | De Remer | Apr. 3, 1945 |
| 2,391,561 | Geldhof et al. | Dec. 25, 1945 |
| 2,425,788 | Edwards | Aug. 19, 1947 |
| 2,453,707 | Graham | Nov. 16, 1948 |
| 2,475,503 | Holthouse | July 5, 1949 |
| 2,479,177 | Miller | Aug. 16, 1949 |
| 2,503,901 | Chace | Apr. 11, 1950 |
| 2,520,797 | Buss et al. | Aug. 29, 1950 |
| 2,523,801 | Woodson | Sept. 26, 1950 |
| 2,528,422 | Chace | Oct. 31, 1950 |
| 2,533,624 | Ray | Dec. 12, 1950 |

FOREIGN PATENTS

| Number | Country | Date |
|---|---|---|
| 824,881 | France | Nov. 18, 1937 |